(12) United States Patent
Takahashi et al.

(10) Patent No.: US 12,284,701 B2
(45) Date of Patent: Apr. 22, 2025

(54) BASE STATION AND COMMUNICATION METHOD

(71) Applicant: NTT DOCOMO, INC., Tokyo (JP)

(72) Inventors: Hideaki Takahashi, Tokyo (JP); Tianyang Min, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 307 days.

(21) Appl. No.: 17/759,285

(22) PCT Filed: Sep. 28, 2020

(86) PCT No.: PCT/JP2020/036749
§ 371 (c)(1),
(2) Date: Jul. 21, 2022

(87) PCT Pub. No.: WO2021/171673
PCT Pub. Date: Sep. 2, 2021

(65) Prior Publication Data
US 2023/0062255 A1    Mar. 2, 2023

(30) Foreign Application Priority Data

Feb. 28, 2020  (JP) .................................. 2020-033804

(51) Int. Cl.
*H04W 76/15*     (2018.01)
*H04W 72/0453*   (2023.01)
*H04W 72/27*     (2023.01)

(52) U.S. Cl.
CPC ....... *H04W 76/15* (2018.02); *H04W 72/0453* (2013.01); *H04W 72/27* (2023.01)

(58) Field of Classification Search
CPC ........................... H04W 72/20; H04L 27/2671
(Continued)

(56) References Cited

U.S. PATENT DOCUMENTS 10,750,501 B2 *  8/2020  Tong ................. H04W 8/24
11,206,601 B2 * 12/2021  Kim .................. H04W 48/02
(Continued)

FOREIGN PATENT DOCUMENTS

JP   2023510772 A   3/2023
WO   2019/221549 A1  11/2019
WO   2021162599 A1   8/2021

OTHER PUBLICATIONS

Extended European Search Report issued in counterpart European Application No. 20921150.7 mailed on Mar. 18, 2024 (8 pages).
(Continued)

*Primary Examiner* — Kiet M Doan
(74) *Attorney, Agent, or Firm* — Osha Bergman Watanabe & Burton LLP

(57) ABSTRACT

A base station includes a receiving unit that receives capability information including information indicating a first group consisting of band combinations that can be used only for a specific dual connectivity, and information indicating a second group consisting of band combinations that can be used for the specific dual connectivity in a terminal; a control unit that assigs a plurality of indexes to a corresponding plurality of band combinations of a third group, the third group consisting of the plurality of band combinations consisting of the band combinations of the first group and the band combinations of the second group, so that each band combination of the plurality of band combinations of the third group can be identified; and a transmitting unit that transmits, to another base station, a signal that can be used for communication between the base stations, the signal including the indexes.

3 Claims, 21 Drawing Sheets

(58) Field of Classification Search
USPC .................................. 370/329; 375/135, 267
See application file for complete search history.

(56) References Cited

U.S. PATENT DOCUMENTS

2021/0105646 A1* 4/2021 Siomina ................ H04W 24/08
2021/0203393 A1* 7/2021 Chung ................. H04B 7/0486

OTHER PUBLICATIONS

Ericsson; "Capability coordination for NE-DC"; 3GPP TSG-RAN WG2 #109-e, R2-2001224; Electronic meeting; Feb. 24-Mar. 6, 2020 (15 pages).
International Search Report issued in PCT/JP2020/036749, mailed on Dec. 22, 2020 (3 pages).
Written Opinion of the International Searching Authority issued in PCT/JP2020/036749, mailed on Dec. 22, 2020 (3 pages).
3GPP TS 38.300 V15.4.0; "3rd Generation Partnership Project; Technical Specification Group Radio Access Network; NR; NR and NG-RAN Overall Description; Stage 2 (Release 15)"; Dec. 2018 (97 pages).
3GPP TS 37.340 V15.4.0; "3rd Generation Partnership Project; Technical Specification Group Radio Access Network; Evolved Universal Terrestrial Radio Access (E-UTRA) and NR; Multi-connectivity; Stage 2 (Release 15)"; Dec. 2018 (67 pages).
3GPP TS 38.101-3 V15.3.0; "3rd Generation Partnership Project; Technical Specification Group Radio Access Network; NR; User Equipment (UE) radio transmission and reception; Part 3: Range 1 and Range 2 Interworking operation with other radios (Release 15)"; Sep. 2018 (195 pages).
3GPP TS 38.331 V16.1.0 ; "3rd Generation Partnership Project; Technical Specification Group Radio Access Network; NR; Radio Resource Control (RRC) protocol specification (Release 16)"; Jul. 2020 (93 pages).
Nokia, Nokia Shanghai Bell, Intel Corporation, ZTE Corporation, Sanechips, Sprint Corporation; "Inter-Node Message Impacts due to intra-band EN-DC"; 3GPP TSG-RAN WG2 Meeting #105, R2-1900292; Athens, Greece, Feb. 25-Mar. 1, 2019 (3 pages).
Office Action in Japanese Application No. 2022-503074, dated Aug. 27, 2024 (6 pages).
Officce Action issued in Chinese Application No. 202080095023.9, mailed Jun. 17, 2024 (15 pages).
Office Action issued in counterpart Chinese Patent Application No. 202080095023.9 mailed on Jan. 23, 2025 (14 pages).

* cited by examiner

FIG.4

CG-ConfigInfo

This message is used by master eNB or gNB to request the SgNB to perform certain actions e.g. to establish, modify or release an SCG. The message may include additional information e.g. to assist the SgNB to set the SCG configuration. It can also be used by a CU to request a DU to perform certain actions, e.g. to establish, modify or release an MCG or SCG.

Direction: Master eNB or gNB to secondary gNB, alternatively CU to DU.

*CG-ConfigInfo message*

```
CG-ConfigInfo
CG-ConfigInfo-IEs
ConfigRestrictInfoSCG
  allowedBC-ListMRDC-v1550  BandCombinationInfoList-v1550  OPTIONAL   Cond intraBandENDC
BandCombinationInfoList-v1550 ::= SEQUENCE (SIZE (1..maxBandCombo)) of BandCombinationInfo-v1550
BandCombinationInfo-v1550 ::= SEQUENCE{
 configuredFrequencyRangeMCG   CHOICE{ eutra  FrequencyRangeEUTRA, nr  Frequency rangeNR}}
 FrequencyRangeEUTRA :: = SEQUENCE {dl-LowerEdge ARFCN-ValueEUTRA, dl-UpperEdge  ARFCN-
ValurEUTRA, ul-LowerEdge ARFCN-ValueEUTRA OPTIONAL, ul-UpperEdge ARFCN-ValurEUTRA OPTIONAL}
 FrequencyRangeNR :: = SEQUENCE {dl-LowerEdge ARFCN-ValueNR, dl-UpperEdge  ARFCN-ValurNR, ul-
LowerEdge ARFCN-ValueNR OPTIONAL, ul-UpperEdge ARFCN-ValurNR OPTIONAL}
```

FIG. 5

| Downlink EN-DC configuration | Uplink EN-DC configurations | E-UTRA – NR configuration / Bandwidth combination set ||||| Bandwidth combination set |
|---|---|---|---|---|---|---|
| | | Component carriers in order of increasing carrier frequency |||| Maximum aggregated bandwidth (MHz) | |
| | | Channel bandwidths for LTE carrier (MHz) | Channel bandwidths NR for carrier (MHz) | Channel bandwidths for LTE carrier (MHz) | | | |
| DC_(n)41AA | DC_(n)41AA | 20 | 40, 60, 80, 100 | | 120 | 0 |
| | | 20 | 40, 60, 80, 100 | 20 | 120 | 1 |
| DC_(n)41CA | DC_(n)41AA¹, DC_41A_n41A² | 20+20 | 40, 50, 60, 80, 100 | 20 | 140 | 0 |
| | | 20+20 | 40, 50, 60, 80, 100 | 20+20 | 140 | 1 |
| DC_(n)41DA | DC_(n)41AA¹, DC_41A_n41A² | 20+20+20 | 40, 60, 80, 100 | 20+20 | 160 | 0 |
| | | 20+20+20 | 40, 60, 80, 100 | 20+20+20 | 160 | 1 |
| DC_(n)71B | DC_(n)71B | 15 | 5 | 15 | 20 | 0 |
| | | 10 | 5, 10 | 10 | | |
| | | 5 | 5 | 5 | | |
| | | | 5, 10 | | | |
| | | | 5, 10, 15 | | | |

NOTE 1: Contiguous intra-band EN-DC uplink requirements shall apply.
NOTE 2: LTE and NR ACLR requirements and non-contiguous intra-band EN-DC uplink requirements shall apply.

FIG. 6

| Downlink EN-DC configuration | E-UTRA – NR configuration / Bandwidth combination set ||||||
|---|---|---|---|---|---|---|
| | Uplink EN-DC configurations | Component carriers in order of increasing carrier frequency ||| Maximum aggregated bandwidth (MHz) | Bandwidth combination set |
| | | Channel bandwidths for LTE carrier (MHz) | Channel bandwidths NR for carrier (MHz) | Channel bandwidths for LTE carrier (MHz) | | |
| DC_3A_n3A | DC_3A_n3A[(1)] | | 5, 10, 15, 20, 25, 30 | 5, 10, 15, 20 | 50 | 0 |
| DC_41A_n41A | DC_41A_n41A | 20 | 40, 60, 80, 100 | | 120 | 0 |
| | | 20 | 40, 60, 80, 100 | 20 | 120 | 1 |
| DC_41C_n41A | DC_41A_n41A | 20+20 | 40, 50, 60, 80, 100 | | 140 | 0 |
| | | 20+20 | 40, 60, 80, 100 | 20+20 | 140 | 1 |
| DC_41D_n41A | DC_41A_n41A | 20+20+20 | 40, 50, 60, 80, 100 | | 160 | 0 |
| | | 20+20+20 | 40, 50, 60, 80, 100 | 20+20+20 | 160 | 1 |

NOTE 1: Only single switched UL is supported in Rel.15

*CG-ConfigInfo*

This message is used by master eNB or gNB to request the SgNB to perform certain actions e.g. to establish, modify or release an SCG. The message may include additional information e.g. to assist the SgNB to set the SCG configuration. It can also be used by a CU to request a DU to perform certain actions, e.g. to establish, modify or release an MCG or SCG.
Direction: Master eNB or gNB to secondary gNB, alternatively CU to DU.

*CG-ConfigInfo message*

```
CG-ConfigInfo
CG-ConfigInfo-IEs
ConfigRestrictInfoSCG
    allowedBC-ListMRDC-v1550   BandCombinationInfoList-v1550   OPTIONAL    Cond intraBandENDC
BandCombinationInfoList-v1550 ::= SEQUENCE (SIZE (1..maxBandCombo)) of BandCombinationInfo-v1550
BandCombinationInfo-v1550 ::= SEQUENCE{
    allowedBandwidthCombinationSet   BIT STRING (SIZE (1..32))  OPTIONAL,
    componentCarrierPositionEUTRA  ENUMERATED {lower, upper}  OPTIONAL}
```

CG-ConfigInfo field descriptions

*allowedBC-ListMRDC*
A list of indices referring to band combinations in MR-DC capabilities from which SN is allowed to select an NR band combination. Each entry refers to a band combination numbered according to supportedBandCombinationList in the UE-MRDC-Capability and the Feature Sets allowed for each band entry. All MR-DC band combinations indicated by this field comprise the LTE band combination, which is a superset of the LTE band(s) selected by MN. For intra-band contiguous DC or intra-band non-contiguous DC combination, this list includes *allowedBandwidthCombinationSet* and *componentCarrierPositionEUTRA*.

BandCombinationInfo field descriptions

*allowedBandwidthCombinationSet*
Indicates the bandwidth combination set from which SN is allowed to select.
*allowedFeatureSetsList*
Defines a subset of the entries in a FeatureSetCombination. Each index identifies one FeatureSetUplink/Downlink for each band entry in the associated band combination.
*bandCombinationIndex*
The position of a band combination in the supportedBandCombinationList
*componentCarrierPositionEUTRA*
Indicates the E-UTRA component carrier position compared to NR component carriers as specified in TS 38.101 (e.g. Table 5.3B.1.2-1 and Table 5.3B.1.3-1).

| Conditional Presence | Explanation |
|---|---|
| intraBandENDC | The field is mandatory present if the band combination indicated by *bandCombinationIndex* is intra-band contiguous EN-DC or intra-band non-contiguous EN-DC. |
| SN-Addition | The field is mandatory present upon SN addition. |

FIG.9

CG-Config message

```
-- ASN1START
-- TAG-CG-CONFIG-START

CG-Config ::=          SEQUENCE {
    criticalExtensions         CHOICE {
        c1                         CHOICE{
            cg-Config                  CG-Config-IEs,
            spare3 NULL, spare2 NULL, spare1 NULL
        },
        criticalExtensionsFuture   SEQUENCE {}
    }
}

...
nonCriticalExtension       CG-Config-v1580-IEs SEQUENCE {}                    OPTIONAL
}

CG-Config-v1580-IEs SEQUENCE {                                    OPTIONAL
}

CG-Config-v1580-IEs ::=    SEQUENCE{
    selectedBandCombination    BandCombinationInfoSN              OPTIONAL
    nonCriticalExtension       SEQUENCE {}                        OPTIONAL
}

...
ConfigRestrictModReqSCG ::=    SEQUENCE {
    requestedBC-MRDC               BandCombinationInfoSN                      OPTIONAL,
    requestedP-MaxFR1              P-Max                                      OPTIONAL,
    ...,
    [[
    requestedPDCCH-BlindDetectionSCG   INTEGER (1..15)                        OPTIONAL,
    requestedP-MaxEUTRA            P-Max                                      OPTIONAL
    ]],
    [[
    requestedBC-NEDC               BandCombinationInfoSN                      OPTIONAL
    ]]
}
...
```

FIG. 10

| CG-Config field descriptions |
|---|
| *requestedBC-MRDC*<br>Used to request configuring ~~an NR~~ band combination from *supportedBandCombinationList* in the *UE-MRDC-Capability* (in case of (NG)EN-DC or NE-DC) or UE-NR-Capability (in case of NR-DC) and corresponding feature sets<u>,</u> which are forbidden to use by MN (i.e. outside of the *allowedBC-ListMRDC*) to allow re-negotiation of the UE capabilities for SCG configuration. <u>In NE-DC, when this field is included, the field *requestedBC-NEDC* is not included.</u> |
| *requestedBC-NEDC*<br><u>Used to request configuring a band combination from *supportedCombinationListNEDC-Only* and corresponding feature sets, which are forbidden to use by MN (i.e. outside of the *allowedBC-ListNEDC*) to allow re-negotiation of the UE capabilities for SCG configuration. When this field is included, the field *requestedBC-MRDC* is not included. This field is only used in NE-DC.</u> |
| *selectedBandCombination*<br>Indicates the band combination selected by SN among the band combinations allowed by *allowedBC-ListMRDC* in (NG)EN-DC, NE-DC, and NR-DC. The SN should inform the MN with this field whenever the band combination and/or feature set it selected for the SCG changes (i.e. even if the new selection concerns a band combination and/or feature set that is allowed by the *allowedBC-ListMRDC*). <u>In NE-DC, when this field is included, the field *selectedBandCombinationNEDC* is not included.</u> |
| *selectedBandCombinationNEDC*<br><u>Indicates the band combination selected by SN among the band combinations allowed by *allowedBC-ListNEDC*, in NE-DC. The SN should inform the MN with this field whenever the band combination and/or feature set it selected for the SCG changes (i.e. even if the new selection concerns a band combination and/or feature set that is allowed by the *allowedBC-ListNEDC*). When this field is included, the field *selectedBandCombination* is not included. This field is only used in NE-DC.</u> |

FIG.11

*CG-ConfigInfo message*

```
-- ASN1START
-- TAG-CG-CONFIG-INFO-START

CG-ConfigInfo ::=         SEQUENCE {
    criticalExtensions        CHOICE {
        c1                        CHOICE{
            cg-ConfigInfo             CG-ConfigInfo-IEs,
            spare3 NULL, spare2 NULL, spare1 NULL
        },
        criticalExtensionsFuture  SEQUENCE {}
    }
}

ConfigRestrictInfoSCG ::=    SEQUENCE {
    ...,
    [[
    selectedBandEntriesMNList      SEQUENCE (SIZE (1..maxBandComb)) OF SelectedBandEntriesMN   OPTIONAL,
    pdcch-BlindDetectionSCG        INTEGER (1..15)                                              OPTIONAL,
    maxNumberROHC-ContextSessionsSN INTEGER(0..16384)                                           OPTIONAL
    ]],
    [[
    allowedBC-ListNEDC             BandCombinationInfoList                                      OPTIONAL
    ]]
}
...
```

FIG.12

| CG-ConfigInfo field descriptions |
|---|
| *allowedBC-ListNEDC* <br> A list of indices referring to band combinations in NE-DC capabilities from which SN is allowed to select the SCG band combination. Each entry refers to a band combination numbered according to *supportedBandCombinationListNEDC-Only*. All MR-DC band combinations indicated by this field comprise the MCG band combination, which is a superset of the MCG band(s) selected by MN. When *allowedBC-ListMRDC* is included and this field is not included, the SN is not allowed to select an SCG band combination from *supportedBandCombinationListNEDC-Only*. When *allowedBC-ListMRDC* is not included and this field is included, the SN is not allowed to select an SCG band combination from *supportedBandCombinationList*. This field is only used in NE-DC. |

FIG.13

*CG-Config* message

```
-- ASN1START
-- TAG-CG-CONFIG-START

CG-Config ::=              SEQUENCE {
    criticalExtensions         CHOICE {
        c1                         CHOICE{
            cg-Config                  CG-Config-IEs,
            spare3 NULL, spare2 NULL, spare1 NULL
        },
        criticalExtensionsFuture   SEQUENCE {}
    }
}
...
nonCriticalExtension       CG-Config-v1580-IEs                             OPTIONAL
}

CG-Config-v1580-IEs ::=    SEQUENCE {
    useBandCombinationListNEDC-Only    ENUMERATED {true}         OPTIONAL,
    nonCriticalExtension       SEQUENCE {}                                 OPTIONAL
}
...
```

FIG.14

| CG-Config field descriptions |
|---|
| *useBandCombinationListNEDC-Only* |
| If this field is set to true, |
| - *requestedBC-MRDC* is used to request configuring a band combination from *supportedBandCombinationListNEDC-Only* and corresponding feature sets, which are forbidden to use by MN (i.e. outside of the *allowedBC-ListMRDC*) to allow re-negotiation of the UE capabilities for SCG configuration, and |
| - *selectedBandCombination* indicates the band combination selected by SN among the NE-DC band combinations allowed by *allowedBC-ListMRDC*. The SN should inform the MN with this field whenever the band combination and/or feature set it selected for the SCG changes (i.e. even if the new selection concerns a band combination and/or feature set that is allowed by the *allowedBC-ListMRDC*). |
| This field is only used in NE-DC. |

FIG.15

*CG-ConfigInfo* message

```
-- ASN1START
-- TAG-CG-CONFIG-INFO-START

CG-ConfigInfo ::=           SEQUENCE {
    criticalExtensions          CHOICE {
        c1                          CHOICE{
            cg-ConfigInfo               CG-ConfigInfo-IEs,
            spare3 NULL, spare2 NULL, spare1 NULL
        },
        criticalExtensionsFuture    SEQUENCE {}
    }
}

ConfigRestrictInfoSCG ::=   SEQUENCE {
    ...,
    [[
    selectedBandEntriesMNList       SEQUENCE (SIZE (1..maxBandComb)) OF SelectedBandEntriesMN  OPTIONAL,
    pdcch-BlindDetectionSCG         INTEGER (1..15)                                            OPTIONAL,
    maxNumberROHC-ContextSessionsSN INTEGER(0..16384)                                          OPTIONAL
    ]],
    [[
    useBandCombinationListNEDC-Only ENUMERATED {true}                                          OPTIONAL
    ]]
},
...
```

FIG.16

| CG-ConfigInfo field descriptions |
|---|
| *useBandCombinationListNEDC-Only*<br>If this field is set to true, allowedBC-ListMRDC refers to band combinations in NE-DC capabilities from which SN is allowed to select the SCG band combination. Each entry refers to a band combination numbered according to *supportedBandCombinationListNEDC-Only*. All MR-DC band combinations indicated by this field comprise the MCG band combination, which is a superset of the MCG band(s) selected by MN. When *allowedBC-ListMRDC* is included and this field is not included, the SN is not allowed to select an SCG band combination from supportedBandCombinationListNEDC-Only. When *allowedBC-ListMRDC* is not included and this field is included, the SN is not allowed to select an SCG band combination from supportedBandCombinationList. This field is only used in NE-DC. |

FIG.20

| BandCombinationInfoSN field descriptions |
|---|
| bandCombinationIndex <br> The position of a band combination in the *supportedBandCombinationList*. <u>If useBandCombinationListNEDC-Only is set to true, this index pinpoints the position of a band combination in the supportedBandCombinationList in the order of entry, and then supportedBandCombinationListNEDC-Only in the order of entry.</u> |
| requestedFeatureSets <br> The position in the *FeatureSetCombination* which identifies one *FeatureSetUplink/Downlink* for each band entry in the associated band combination |

FIG.21

| CG-ConfigInfo field descriptions |
|---|
| *useBandCombinationListNEDC-Only* <br> If this field is set to true, allowedBC-ListMRDC refers to band combinations in NE-DC capabilities from which SN is allowed to select the SCG band combination. Each entry refers to a band combination numbered according to *supportedBandCombinationList and* *supportedBandCombinationListNEDC-Only*. All MR-DC band combinations indicated by this field comprise the MCG band combination, which is a superset of the MCG band(s) selected by MN. |

FIG.22

| BandCombinationInfo field descriptions |
|---|
| *allowedFeatureSetsList*<br>Defines a subset of the entries in a *FeatureSetCombination*. Each index identifies a position in the *FeatureSetCombination*, which corresponds to one *FeatureSetUplink/Downlink* for each band entry in the associated band combination. |
| *bandCombinationIndex*<br>The position of a band combination in the *supportedBandCombinationList*. <u>If *useBandCombinationListNEDC-Only* is set to true, this index pinpoints the position of a band combination in the supportedBandCombinationList in the order of entry, and then supportedBandCombinationListNEDC-Only in the order of entry.</u> |

BASE STATION AND COMMUNICATION METHOD

TECHNICAL FIELD

The present invention relates to a base station and a communication method in a radio communication system.

BACKGROUND ART

For New Radio (NR) (which is also referred to as "5G") that is a successor system to Long Term Evolution (LTE), a technique has been studied that meets requirements on large capacity system, a high data transmission rate, low latency, simultaneous connection of multiple terminals, low cost, power saving, and the like (e.g., Non-Patent Document 1).

In an NR system, similar to dual connectivity in an LTE system, a technique called LTE-NR dual connectivity, NR-NR dual connectivity, or Multi Radio Access Technology (Multi-RAT) dual connectivity (which is referred to as "MR-DC," hereinafter) has been introduced such that data is divided between a base station of an LTE system (eNB) and a base station of an NR system (gNB) and data is simultaneously transmitted and received by these base stations (e.g., Non-Patent Document 2).

PRIOR ART DOCUMENT

Non-Patent Document

Non-Patent Document 1: 3GPP TS 38.300 V15.4.0 (2018 December)
Non-Patent Document 2: 3GPP TS 37.340 V15.4.0 (2018 December)
Non-Patent Document 3: 3GPP TS 38.101-3 V15.3.0 (2018 September)
Non-Patent Document 4: 3GPP TSG-RAN WG2 Meeting #105, R2-1900292, Athens, Greece, 25 Feb.-1 Mar. 2019

SUMMARY OF THE INVENTION

Problem to be Solved by the Invention

NR E-UTRA Dual Connectivity (NE-DC) is dual connectivity in which a master node is gNB and a secondary node is eNB. In NE-DC, a terminal is connected to a gNB that operates as a master node and an eNB that operates as a secondary node, and the gNB is connected to 5G-Core Network (5GC).

There is a need for a method that allows base stations to coordinate so as to configure an NE-DC band combination based UE capability signaling from a terminal that indicates a band combination that can be used for the NE-DC.

Means for Solving the Problem

According to an aspect of the present invention, there is provided a network node including a receiving unit that receives a signal including information indicating a first group consisting of one or more band combinations that can be used only for a specific dual connectivity and information indicating a second group consisting of one or more band combinations that can be used for the specific dual connectivity in a terminal; a control unit that assigs a plurality of indexes to a corresponding plurality of band combinations of a third group, the third group consisting of the plurality of band combinations consisting of the one or more band combinations of the first group and the one or more band combinations of the second group, so that each band combination of the plurality of band combinations of the third group can be uniquely identified; and a transmitting unit that transmits, to another network node, a signal that can be used for communication between the network nodes, the signal including information indicating the plurality of band combinations of the third group.

Advantage of the Invention

According to an embodiment, a method can be provided that allows base stations to coordinate so as to configure an NE-DC band combination based on UE capability signaling from a terminal that indicates a band combination that can be used for the NE-DC.

BRIEF DESCRIPTION OF DRAWINGS

FIG. 4 is a diagram illustrating an example of an information element used for the first operation example in the embodiment.

FIG. 5 is a diagram illustrating an example of a configuration of component carriers for intra-band contiguous EN-DC.

FIG. 6 is a diagram illustrating an example of a configuration of component carriers for intra-band contiguous EN-DC.

FIG. 8 is a diagram illustrating an example of an information element used for the second operation example of the embodiment;

FIG. 9 is a diagram illustrating a modified example of a specification.

FIG. 10 is a diagram illustrating a modified example of a specification.

FIG. 11 is a diagram illustrating a modified example of a specification.

FIG. 12 is a diagram illustrating a modified example of a specification.

FIG. 13 is a diagram illustrating a modified example of a specification.

FIG. 14 is a diagram illustrating a modified example of a specification.

FIG. 15 is a diagram illustrating a modified example of a specification.

FIG. 16 is a diagram illustrating a modified example of a specification.

FIG. 20 is a diagram illustrating a modified example of a specification.

FIG. 21 is a diagram illustrating a modified example of a specification.

FIG. 22 is a diagram illustrating a modified example of a specification.

EMBODIMENTS OF THE INVENTION

In the following, embodiments of the present invention are described with reference to the drawings. The embodiments described below are merely examples, and embodiments to which the present invention is applied are not limited to the embodiments described below.

In operating a radio communication system according to an embodiment of the present invention, existing technology is used as appropriate. Here, the existing technology is, for example, the existing LTE. However, the existing technology is not limited to the existing LTE. The term "LTE" as used in this specification has a broad meaning including LTE-Advanced and a scheme subsequent to LTE-Advanced (e.g., NR), unless as otherwise specified.

In the embodiments of the present invention described below, the terms used in the existing LTE, such as Synchronization signal (SS), Primary SS (PSS), Secondary SS (SSS), Physical broadcast channel (PBCH), and Physical random access channel (PRACH), are used. This is for convenience of description, and signals, functions, or the like similar to these may be referred to by other names. Furthermore, the above-described terms in NR corresponds to NR-SS, NR-PSS, NR-SSS, NR-PBCH, NR-PRACH, or the like. However, even if a signal is used for NR, the signal is not always explicitly denoted as "NR-."

In the embodiments of the present invention, a duplex method may be a Time Division Duplex (TDD) method, an Frequency Division Duplex (FDD) method, or any other method (e.g., Flexible Duplex).

In the embodiments of the present invention, "configuring" a radio parameter may be "pre-configuring" a predetermined value, or configuring a radio parameter notified from a base station 10 or a terminal 20.

Figure 1:
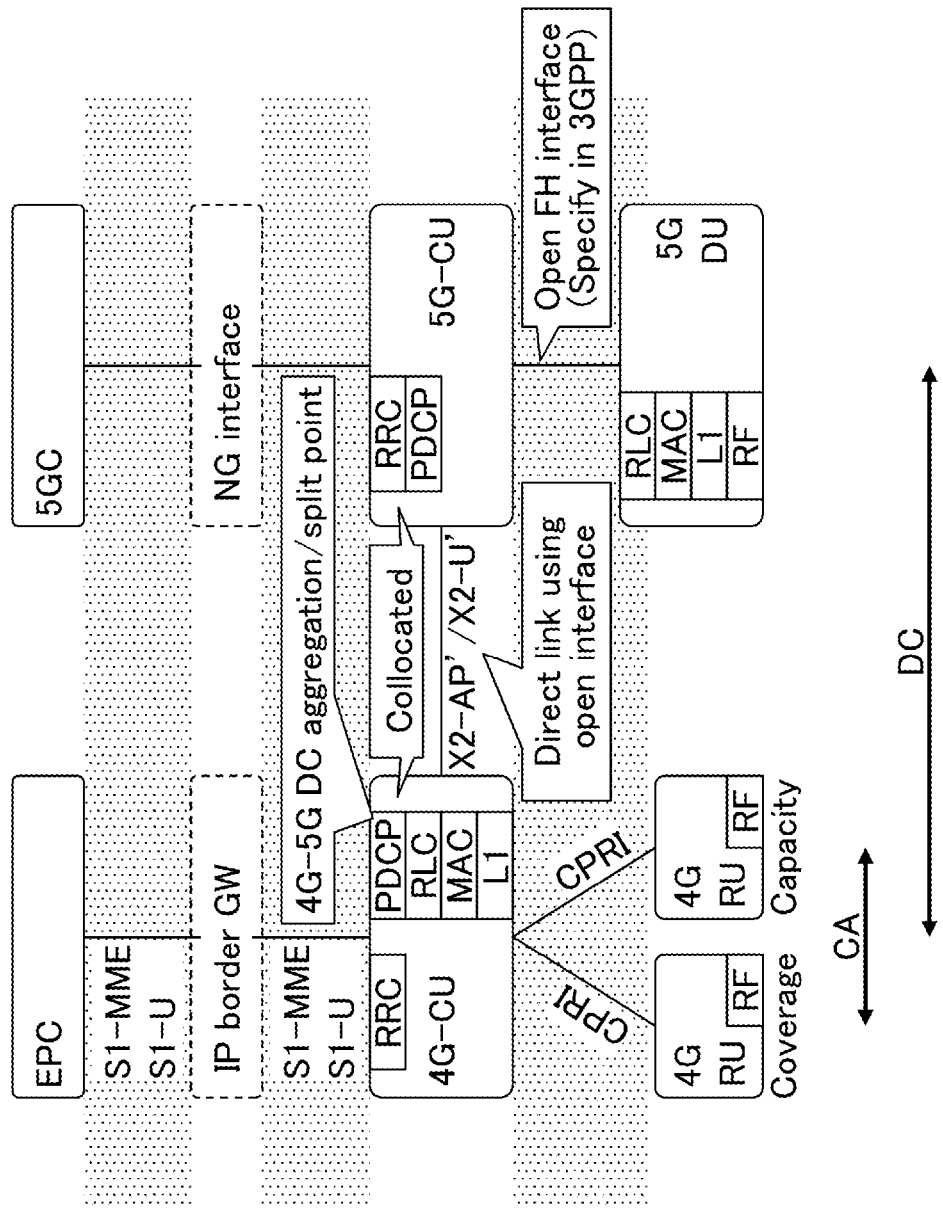
FIG. 1 is a diagram illustrating an example of a configuration of a network architecture according to an embodiment.

FIG. 1 is a diagram illustrating an example of a configuration of a network architecture in the embodiments of the present invention. As illustrated in FIG. 1, a radio network architecture according to an embodiment of the present invention includes 4G-CU, 4G-RU (Remote Unit, remote radio station), an Evolved Packet Core (EPC), or the like at an LTE-Advanced side. The radio network architecture according to the embodiment of the present invention includes 5G-CU, 5G-DU, or the like at a 5G side.

As illustrated in FIG. 1, 4G-CU includes layers up to the Radio Resource Control (RRC), Packet Data Convergence Protocol (PDCP), Radio Link Control (RLC), Medium Access Control (MAC), and L1 (Layer 1, PHY layer or physical layer) and is connected to 4G-RU via Common Public Radio Interface (CPRI). A network node including 4G-CU and 4G-RU is referred to as evolved Node B (eNB).

In the 5G side, as illustrated in FIG. 1, 5G-CU includes an RRC layer; is connected to 5G-DU via an Fronthaul (FH) interface; and is connected to 5G Core Network (5GC) via an NG interface. 5G-CU is also connected to 4G-CU via an X2 interface. The PDCP layer in 4G-CU is a coupling point or a separation point for performing 4G-5G Dual Connectivity (DC), i.e., E-UTRA-NR Dual Connectivity (EN-DC). A network node including 5G-CU and 5G-DU are referred to as gNB. 5G-CU may also be referred to as gNB-CU, and the 5G-DU may be referred to as gNB-DU.

As illustrated in FIG. 1, a Carrier Aggregation (CA) is performed between 4G and RU, and DC is performed between 4G-RU and 5G-DU. Note that, though it is not depicted, a User Equipment (UE) is wirelessly connected via 4G-RU RF or 5G-DU RF to transmit and receive packets.

Note that FIG. 1 illustrates a radio network architecture for LTE-NR DC, i.e., EN-DC (E-UTRA-NR Dual Connectivity). However, a similar radio network architecture may be used when 4G-CU is separated into CU-DU or when NR standalone operation is performed. When the 4G-CU is separated into CU-DU, functions related to the RRC layer and the PDCP layer may be moved to 4G-CU and the RLC layer or lower may be included in 4G-DU. Here, a CPRI data rate may be reduced by CU-DU separation.

A plurality of 5G-DUs may be connected to 5G-CU. Furthermore, NR-NR Dual Connectivity (NR-DC) may be performed by connecting a UE to a plurality of 5G-CUs, or NR-DC may be performed by connecting a UE to a plurality of 5G-DUs and a single 5G-CU.

Figure 2:
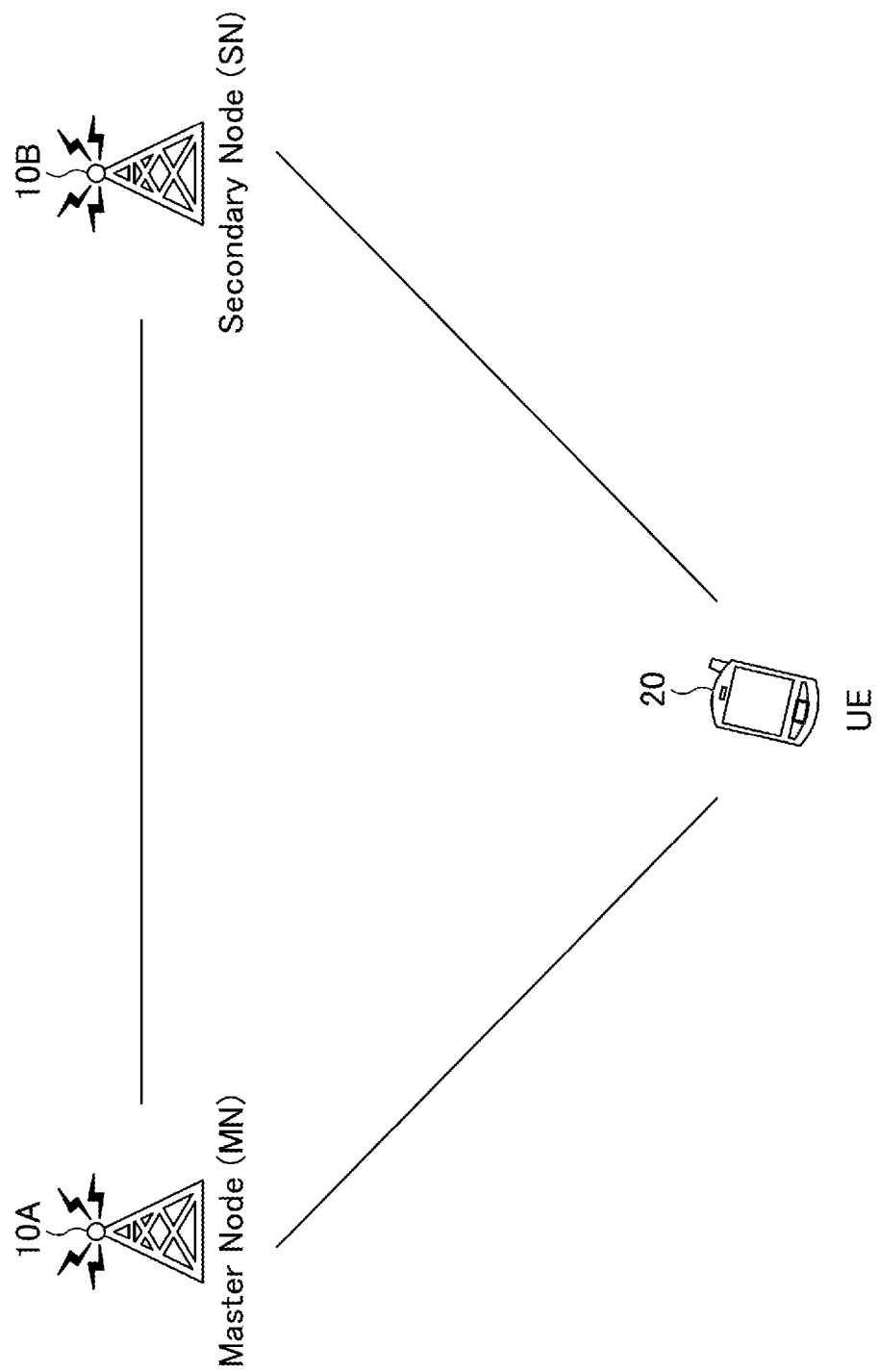
FIG. 2 is a diagram illustrating an example of a configuration of a radio communication system according to an embodiment.

FIG. 2 is a diagram illustrating an example of a configuration of a radio communication system according to an embodiment of the present invention. FIG. 2 is a schematic diagram illustrating the radio communication system during Multi-RAT Dual Connectivity (MR-DC).

As illustrated in FIG. 2, the terminal 20 (which may be user equipment 20, UE 20) communicates with the base station 10A provided in the LTE system and the base station 10B provided in the NR system (in the following, the base station 10A and the base station 10B may be referred to as "base station 10," provided that they are not distinguished). Furthermore, the terminal 20 may also support LTE-NR dual connectivity, i.e., EN-DC, in which the base station 10A is a master node (hereinafter referred to as "MN") and the base station 10B is a secondary node (hereinafter referred to as "SN"). The terminal 20 may simultaneously utilize a plurality of component carriers provided by the base station 10A which is the master node and the base station 10B which is the secondary node to perform simultaneous transmission or simultaneous reception with the base station 10A which is the master node and the base station 10B which is the secondary node.

Note that the embodiments of the present invention are not limited to the above-described cases. For example, in FIG. 2, the base station 10A may be a base station apparatus provided in the NR system, and the base station 10B may be a base station apparatus provided in the LTE system. In this case, the terminal 20 may support NR-LTE dual connectivity, i.e., NE-DC, with the base station 10A as the MN and the base station 10B as the SN. The terminal 20 is capable of executing simultaneous transmission or simultaneous reception with the base station 10A that is the master node and the base station 10B that is the secondary node by simultaneously utilizing a plurality of component carriers provided by the base station 10A that is the master node and the base station 10B that is the secondary node. For example, in FIG. 2, the base station 10A is a base station apparatus provided in the NR system, and the base station 10B may be a base station apparatus provided in the NR system. In this case, the terminal 20 may support NR-NR dual connectivity, i.e., NR-DC with the base station 10A as the MN and the base station 10B as the SN.

Note that although the following embodiments are primarily described with reference to LTE-NR dual connectivity, the base station 10 and terminal 20 according to the embodiments of the present invention are not limited to LTE-NR dual connectivity, but are applicable to dual connectivity, i.e., MR-DC, between multiple radio communication systems utilizing different RATS.

When EN-DC is configured by configuring an LTE component carrier and an NR component carrier in a same frequency band, the LTE component carrier and the NR component carrier are included in the same frequency band. For example, a case is assumed in which the LTE component carrier is configured in a portion of a low frequency band in the frequency band and the NR component carrier is configured in a portion of a high frequency band in the frequency band. Furthermore, as another case, a case is assumed in which the LTE component carrier is configured in a portion of a high frequency band in the frequency band and the NR component carrier is configured in a portion of a low frequency band in the frequency band.

In such a case, in order to avoid overlapping the portion of the frequency band in which the LTE component carrier is configured with the portion of the frequency band in which the NR component carrier is configured, it may be required to communicate some information between the eNB and the gNB.

A method has been proposed in which possible multiple scenarios (patterns of arranging component carriers) for the intra-band contiguous EN-DC and intra-band non-contiguous EN-DC are listed, and all information indicating a center frequency and a bandwidth of each of the component carriers used in each scenario is transmitted.

According to this method, it is possible to avoid overlapping of the portion of the frequency band in which the LTE component carrier is configured with the portion of the frequency band in which the NR component carrier is configured. However, in this method, an amount of the information to be transmitted from the eNB to the gNB may increase.

As described above, when EN-DC (which may be NE-DC or NR-DC) is configured by configuring an LTE component carrier and an NR component carrier in a same frequency band (intra-band EN-DC (which may be intra-band NE-DC or intra-band NR-DC)), there is a need for reducing an information amount for transmitting information from the base station 10A in FIG. 2 to the base station 10B in FIG. 2 so as to avoid overlapping of a portion of the frequency band in which the LTE (or NR) component carrier is configured with a portion of the frequency band in which the NR (or LTE) component carrier is configured.

(Method 1)

In the following, an example of a method 1 is described that is for reducing an amount of information transmitted from the base station 10A to the base station 10B so as to avoid overlapping of a portion of a frequency band in which an LTE component carrier is configured with a portion of a frequency band in which an NR component carrier is configured in intra-band EN-DC. Note that a case to which the method 1 is applied is not limited to the intra-band EN-DC. The method 1 can be applied to intra-band NE-DC and intra-band NR-DC by adding, if it is necessary, modifications appropriately.

First, to simplify the description, a case is considered in which only one component carrier is configured in a single frequency band at the base station 10A. In this case, the base station 10A that is a Master Node transmits, to the base station 10B, information indicating a position of a lower end and a position of an upper end on a frequency axis of the one component carrier to be configured. Upon receiving the information indicating the position of the lower end and the position of the upper end on the frequency axis of the one component carrier to be configured by the base station 10A, the base station 10B can configure, using the received information, one or more component carriers in a frequency band other than the frequency band that is specified by the position of the lower end and the position of the upper end on the frequency axis in the above-described single frequency band. When a plurality of component carriers is to be configured in a single frequency band at the base station 10A, it suffices if information is transmitted to the base station 10B that indicates a position of a lower end and a position of an upper end on the frequency axis of each component carrier to be configured by the base station 10A. Upon receiving the information indicating the position of the lower end and the position of the upper end on the frequency axis of each component carrier to be configured by the base station 10A, the base station 10B can configure, using the received information, one or more component carriers in a frequency band other than the frequency band corresponding to the position of the lower end and the position of the upper end on the frequency axis of each component carrier in the above-described single frequency band.

Operation Example of Method 1

Figure 3:
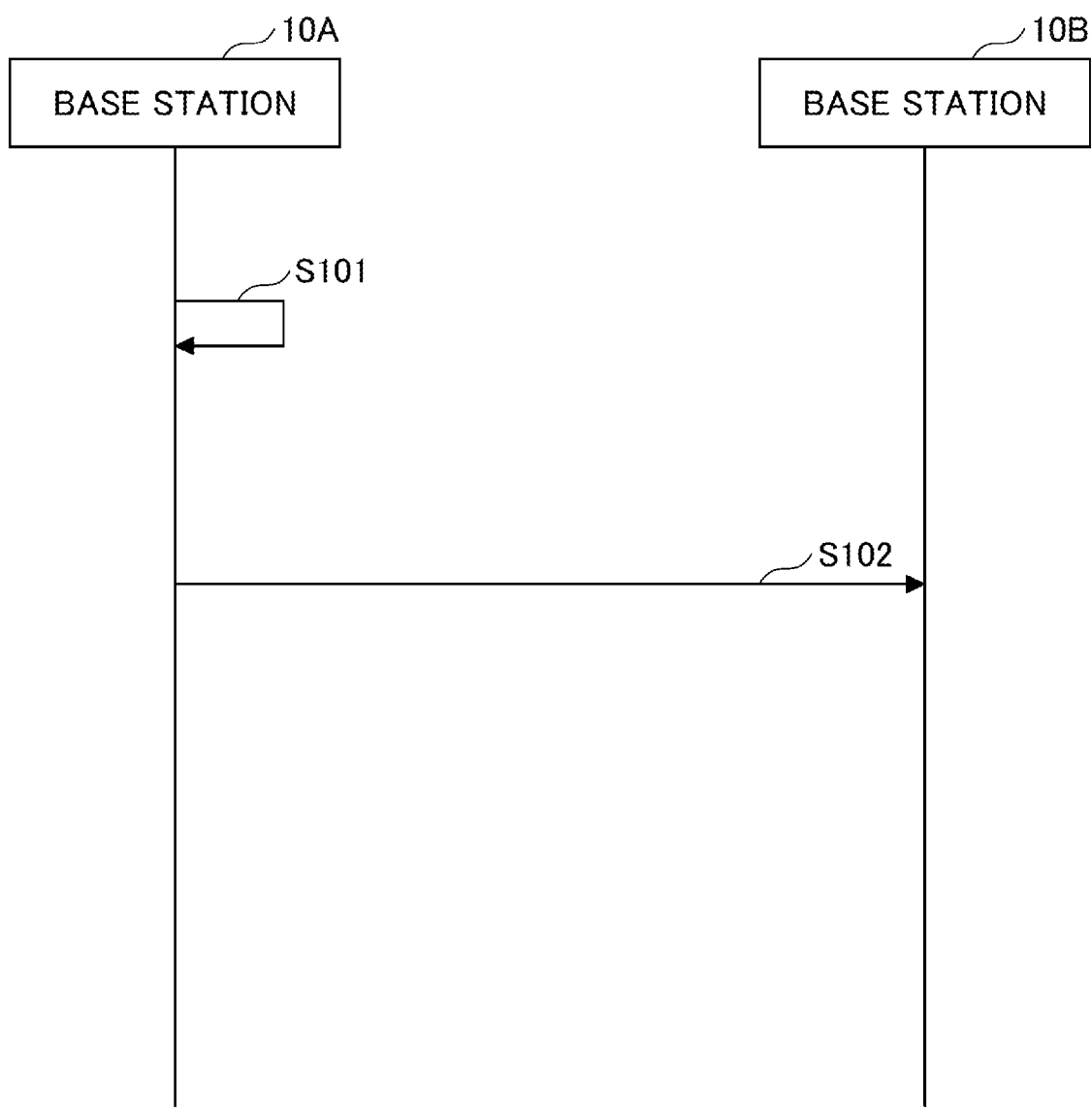
FIG. 3 is a sequence diagram illustrating a first operation example in an embodiment.

Next, an operation example of the method 1 is described with reference to FIG. 3. First, at step S101, the base station 10A determines one or more frequency bands for configuring one or more LTE component carriers in a single frequency band. Next, the base station 10A creates information indicating a position of a lower end and a position of an upper end on a frequency axis of each frequency band among one or more frequency bands in which one or more LTE component carriers are to be configured. At step S102, the base station 10A transmits, to the base station 10B, the created information indicating the position of the lower end and the position of the upper end on the frequency axis of each frequency band. Upon receiving the information indicating the position of the lower end and the position of the upper end on the frequency axis of each component carrier to be configured by the base station 10A, the base station 10B can configure, using the received information, one or more NR component carriers in a frequency band other than the frequency band corresponding to the position of the lower end and the position of the upper end on the frequency axis of each component carrier in the above-described single frequency band. Note that, upon receiving the information indicating the position of the lower end and the position of the upper end on the frequency axis of each component carrier to be configured by the base station 10A, the base station 10B may transmit, to the base station 10A, information or the like for requesting reconfiguration of the frequency position of the component carrier, if there is a condition, such as causing interference with any other communication by the base station 10B, on the frequency position of each component carrier configured by the base station 10A and reconfiguration of the frequency position of the component carrier configured by the base station 10A is required.

According to Method 1, an amount of information to be transmitted can be reduced compared to a method of transmitting information indicating a center frequency and a bandwidth of each component carrier of a plurality of component carriers used in each scenario among all scenarios of arrangement of component carriers.

FIG. 4 is a diagram illustrating an example of an information element used in an operation example of the method 1. FIG. 4 is an example of an internode RRC message "CG-ConfigInfo." "CG-ConfigInfo" is transmitted from the LTE-RAN master node to the NG-RAN secondary node. Alternatively, "CG-ConfigInfo" may be transmitted from the NG-RAN master node to the LTE-RAN secondary node. "CG-ConfigInfo" is an information element for establishing, modifying or releasing a connection in a secondary group.

As illustrated in FIG. 4, "CG-ConfigInfo" includes an information element "CG-ConfigInfo-IEs." "CG-Config-Info-IEs" includes "configuredFrequencyRangeMCG." The "configuredFrequencyRangeMCG" specifies whether the master node is an LTE node or an NR node. If the master node is an LTE node, the "FrequencyRangeEUTRA" specifies a position of a lower end and a position of an upper end on a frequency axis of each frequency band among one or more frequency bands in which one or more LTE component carriers are configured. If the master node is an NR node, "FrequencyRangeNR" specifies a position of a lower end and a position of an upper end on a frequency axis of each frequency band among one or more frequency bands in which one or more NR component carriers are configured.

(Method 2)

In the following, an example of a method 2 is described, which is for reducing an amount of information transmitted from the base station 10A to the base station 10B so as to avoid overlapping of a portion of a frequency band in which an LTE component carrier is configured with a portion of a frequency band in which an NR component carrier is configured in intra-band EN-DC. Note that a case to which the method 2 is applied is not limited to intra-band EN-DC. The method 2 can be applied to intra-band NE-DC and intra-band NR-DC by adding, if it is necessary, modifications appropriately.

The method 2 utilizes a table (FIG. 5) indicating a configuration of component carriers of intra-band contiguous EN-DC or a table (FIG. 6) indicating a configuration of component carriers of intra-band non-contiguous EN-DC.

FIG. 5 is a diagram illustrating an example of a table indicating an EN-DC configuration of intra-band contiguous EN-DC (a configuration of an LTE component carrier and an NR component carrier) and a bandwidth combination set (a set of a combination of bandwidths).

According to the table in FIG. 5, E-UTRA-NR configuration/Bandwidth combination set is specified for each EN-DC configuration (e.g., DC_(n)41AA) used for Downlink EN-DC configuration and Uplink EN-DC configuration. For example, for DC(n)41AA, the E-UTRA Band used is 41 and the NR Band used is n41. In this case, the uplink frequency band is from 2496 MHz to 2690 MHz, and the downlink frequency band is from 2496 MHz to 2690 MHz (TDD applied). A maximum value of an aggregated bandwidth is 120 MHz.

Two types of Bandwidth combination sets (0 and 1) are specified. When the Bandwidth combination set is 0, a bandwidth of an LTE component carrier is 20 MHz, and a bandwidth of an NR component carrier is one of 40 MHz, 60 MHz, 80 MHz, and 100 MHz. When the Bandwidth combination set is 1, a bandwidth of an LTE component carrier is 20 MHz, and a bandwidth of an NR component carrier is one of 40 MHz, 50 MHz, 60 MHz, 80 MHz, and 100 MHz.

For example, when the Bandwidth combination set is 0, as an example in which an LTE component carrier is located in a lower frequency portion and an NR component carrier is located in a higher frequency portion, the table indicates that one combination from {20 MHz, 40 MHz}, {20 MHz, 60 MHz}, {20 MHz, 80 MHz}, and {20 MHz, 100 MHz} can be used, as a combination of a bandwidth of an LTE component carrier and a bandwidth of an NR component carrier.

For example, when the Bandwidth combination set is 0, as an example in which an NR component carrier is located in a lower frequency portion and an LTE component carrier is located in a higher frequency portion, the table indicates that one combination from {40 MHz, 20 MHz}, {60 MHz, 20 MHz}, {80 MHz, 20 MHz}, and {100 MHz, 20 MHz} can be used.

Accordingly, when an index specifying an EN-DC configuration and a bandwidth combination is transmitted from the base station 10A to the base station 10B using the table in FIG. 5, the base station 10B can configure a frequency location of an NR component carrier so as to avoid overlapping with a portion of a frequency band in which an LTE component carrier is to be configured by the base station 10A. In this case, a parameter may be additionally transmitted, which indicates, in an aggregated frequency band in which an LTE component carrier and an NR component carrier are configured, whether the LTE component carrier is assigned to a lower frequency portion of the aggregated frequency band or the LTE component carrier is assigned to a higher frequency portion of the aggregated frequency band. For example, as a parameter described above, componentCarrierPositionEUTRA may be defined and the componentCarrierPositionEUTRA may be configured so as to take one of the values {lower, upper}.

Additionally or alternatively, for example, the base station 10A may transmit, to the base station 10B, information indicating a center frequency of a frequency band configured for an LTE component carrier, information indicating a frequency position of a lower end of the frequency band configured for the LTE component carrier, and/or information indicating a frequency position of an upper end of the frequency band configured for the LTE component carrier, in addition to the index specifying the EN-DC configuration and the band combination, so as to explicitly specify the location of the LTE component carrier.

In this case, for example, for the above-described index and information indicating the center frequency of the frequency band in which the LTE component carrier is configured, a new index may be defined and the defined new index may be transmitted from the base station 10A to the base station 10B. Alternatively or additionally, for the above-described index and information indicating a frequency position of a lower end of the frequency band in which the LTE component carrier is configured, a new index may be defined and the defined new index may be transmitted from the base station 10A to the base station 10B. Alternatively or additionally, for the above-described index and information indicating the frequency position of the upper end of the frequency band in which the LTE component carrier is configured, a new index may be defined and the defined new index may be transmitted from the base station 10A to the base station 10B.

FIG. 6 is a diagram illustrating an example of a table indicating a configuration of an intra-band non-contiguous EN-DC component carrier.

According to the table in FIG. 6, an E-UTRA-NR configuration/Bandwidth combination set is specified for each EN-DC configuration (e.g., DC_41A_n41A) used for a Downlink EN-DC configuration and an Uplink EN-DC configuration. For example, if the EN-DC configuration used is DC_41A_n41A, the E-UTRA Band used is 41 and the NR Band used is n41. In this case, the uplink frequency band is from 2496 MHz to 2690 MHz, and the downlink frequency band is from 2496 MHz to 2690 MHz (TDD is applied). The maximum value of the aggregated bandwidth is 120 MHz.

Two types of Bandwidth combination sets (0 and 1) are specified. When the Bandwidth combination set is 0, a bandwidth of an LTE component carrier is 20 MHz, and a bandwidth of an NR component carrier is one of 40 MHz, 60 MHz, 80 MHz, and 100 MHz. When the Bandwidth combination set is 1, a bandwidth of an LTE component carrier is 20 MHz, and a bandwidth of an NR component carrier is one of 40 MHz, 50 MHz, 60 MHz, 80 MHz, and 100 MHz.

For example, when the Bandwidth combination set is 0, as an example in which an LTE component carrier is located in a lower frequency portion and an NR component carrier is located in a higher frequency portion, the table indicates that one combination from {20 MHz, 40 MHz}, {20 MHz, 60 MHz}, {20 MHz, 80 MHz}, and {20 MHz, 100 MHz} can be used, as a combination of a bandwidth of an LTE component carrier and a bandwidth of an NR component carrier.

For example, when the Bandwidth combination set is 0, as an example in which an NR component carrier is located in a lower frequency portion and an LTE component carrier is located in a higher frequency portion, the table indicates that one combination from {40 MHz, 20 MHz}, {60 MHz, 20 MHz}, {80 MHz, 20 MHz}, and {100 MHz, 20 MHz} can be used.

Accordingly, when an index specifying an EN-DC configuration and a bandwidth combination is transmitted from the base station 10A to the base station 10B using the table in FIG. 6, the base station 10B can configure a frequency location of an NR component carrier so as to avoid overlapping with a portion of a frequency band in which an LTE component carrier is to be configured by the base station 10A. In this case, a parameter may be additionally transmitted, which indicates, in an aggregated frequency band in which an LTE component carrier and an NR component carrier are configured, whether the LTE component carrier is assigned to a lower frequency portion of the aggregated frequency band or the LTE component carrier is assigned to a higher frequency portion of the aggregated frequency band. For example, as a parameter described above, componentCarrierPositionEUTRA may be defined and the componentCarrierPositionEUTRA may be configured so as to take one of the values {lower, upper}.

Additionally or alternatively, for example, the base station 10A may transmit, to the base station 10B, information indicating a center frequency of a frequency band configured for an LTE component carrier, information indicating a frequency position of a lower end of the frequency band configured for the LTE component carrier, and/or information indicating a frequency position of an upper end of the frequency band configured for the LTE component carrier, in addition to the index specifying the EN-DC configuration and the band combination, so as to explicitly specify the location of the LTE component carrier.

In this case, for example, for the above-described index and information indicating the center frequency of the frequency band in which the LTE component carrier is configured, a new index may be defined and the defined new index may be transmitted from the base station 10A to the base station 10B. Alternatively or additionally, for the above-described index and information indicating a frequency position of a lower end of the frequency band in which the LTE component carrier is configured, a new index may be defined and the defined new index may be transmitted from the base station 10A to the base station 10B. Alternatively or additionally, for the above-described index and information indicating the frequency position of the upper end of the frequency band in which the LTE component carrier is configured, a new index may be defined and the defined new index may be transmitted from the base station 10A to the base station 10B.

According to the method 2, an amount of information to be transmitted can be reduced compared to a method of transmitting information indicating a center frequency and a bandwidth of each component carrier of a plurality of component carriers used in each scenario of all scenarios for arrangement of component carriers.

Operation Example of Method 2

Figure 7:
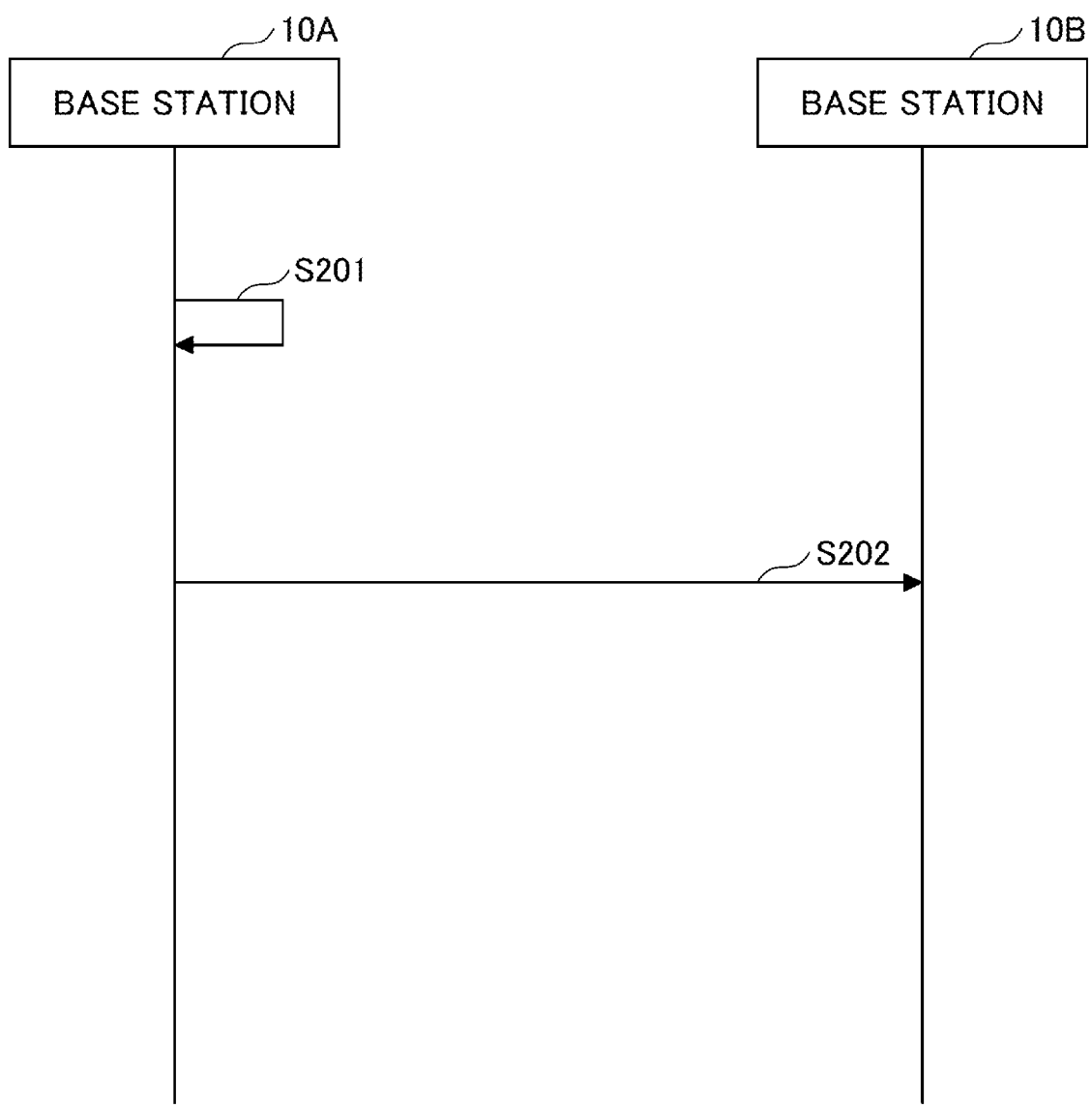
FIG. 7 is a sequence diagram illustrating a second operation example of an embodiment.

Next, an operation example of the method 2 is described with reference to FIG. 7. First, at step S201, the base station 10A determines one or more frequency bands for configuring one or more LTE component carriers in a single frequency band. Next, the base station 10A identifies an index indicating E-UTRA-NR configuration/Bandwidth combination set corresponding to one or more frequency bands of one or more configured LTE component carriers by referring a table specifying E-UTRA-NR configuration/Bandwidth combination set for each EN-DC configuration used for a Downlink EN-DC configuration and an Uplink EN-DC configuration. At step S202, the base station 10A transmits a signal indicating the identified index to the base station 10B. Upon receiving the index indicating the E-UTRA-NR configuration/Bandwidth combination set corresponding to one or more frequency bands of the one or more LTE component carriers configured by the base station 10A, the base station 10B can configure, using the received index, a frequency band for configuring each component carrier, based on the E-UTRA-NR configuration/Bandwidth combination set in the above-described single frequency band. Note that, if there is a condition, such as causing interference with any other communication by the base station 10B, on the frequency position of each component carrier configured by the base station 10A and reconfiguration of the frequency position of the component carrier configured by the base station 10A is required, the base station 10B may transmit, to the base station 10A, information or the like for requesting reconfiguration of the frequency position of the component carrier.

FIG. 8 is a diagram illustrating an example of an information element used in an operation example of the method 2. FIG. 8 is an example of an inter-node RRC message "CG-ConfigInfo." "CG-ConfigInfo" is transmitted from the LTE-RAN master node to the NG-RAN secondary node. Alternatively, "CG-ConfigInfo" may be transmitted from the NG-RAN master node to the LTE-RAN secondary node. "CG-ConfigInfo" is an information element for establishing, modifying or releasing a connection in a secondary group.

As illustrated in FIG. 8, "CG-ConfigInfo" includes an information element "CG-ConfigInfo-IEs." "CG-ConfigInfo-IEs" includes "allowedBandwidthCombinationSet." The "allowedBandwidthCombinationSet" is information indicating an E-UTRA-NR configuration/Bandwidth combination set. For example, the "allowedBandwidthCombinationSet" may be an index. Furthermore, the "componentCarrierPositionEUTRA" included in the "CG-ConfigInfo-IEs" is set to lower or upper. A case in which the "componentCarrierPositionEUTRA" is set to lower corresponds to the case in which an LTE component carrier is assigned to a low frequency portion of the aggregated frequency band. A case in which the "componentCarrierPositionEUTRA" is set to upper corresponds to the case in which an LTE component carrier is assigned to a high frequency portion of the aggregated frequency band.

In the above-described example, an example of signaling that can be used for EN-DC is mainly described. In the following, an example of inter-node signaling is described for NE-DC.

Dual connectivity using E-UTRA and NR radio access technology is called Multi-RAT-Dual Connectivity (MR-DC). In MR-DC, one of an E-UTRA node and an NR node operates as a master node and the other operates as a secondary node. NR E-UTRA Dual Connectivity (NE-DC) is dual connectivity in which the master node (e.g., the base station 10A of FIG. 2) is gNB and the secondary node (e.g., the base station 10B of FIG. 2) is eNB. In NE-DC, the terminal 20 is connected to gNB which operates as a master node and eNB which operates as a secondary node, and gNB is connected to 5GC (5G-Core Network).

(Proposal 1)

In the following, an example of a signaling is described, which is for configuring, when the terminal 20 supports a band combination that can be used only for NE-DC, an NE-DC band combination between base stations based on UE capability signaling from the terminal 20 indicating the band combination that can be used only for NE-DC. As an inter-node message of MR-DC, a supportedBandCombinationList field can be used.

When the terminal 20 supports a band combination that can be used only for NE-DC, for example, the terminal 20 reports the band combination to the gNB that is the master node by dedicated capability signaling, which is supportedBandCombinationListNEDC-Only.

However, it is not assumed that the supportedBandCombinationListNEDC-only field is used as an MR-DC inter-node message. Namely, it is not assumed that the master node that receives the information indicating the band combination that can be used only for NE-DC from the terminal 20 through the supportedBandCombinationListNEDC-only field restricts band combinations for a secondary cell group (SCG) in accordance with one or more band combinations reported through the supprtedBandCombinationListNEDC-only field.

As a solution to the above-described problem, for example, the addition of a new field to the CG-ConfigInfo IE allows functions can be coordinated between MR-DC nodes based on one or more band combinations reported from the terminal 20 through the supportedBandCombinationListNEDC-only field. When an NE-DC band combination is configured between MR-DC nodes based on CG-ConfigInfo, for example, the secondary node may be allowed to request a band combination other than one or more band combinations in the supportedBandCombinationListNEDC-Only that are allowed by the master node. Furthermore, the secondary node may be allowed to report, to the master node, a band combination selected from one or more band combinations in the supportedBandCombinationListNEDC-Only that are allowed by the master node.

FIG. 9 and FIG. 10 are diagrams illustrating an example of a modification of a specification. FIG. 9 and FIG. 10 illustrate an example of modifying a CG-Config message. The CG-Config message may be a message sent from the secondary node to the master node.

For example, as illustrated in the example of FIG. 9, fields may be added to the CG-Config message to provide a notification related to NE-DC, which are selectedBandCombinationNEDC and requestedBC-NEDC.

FIG. 10 illustrates an example of a modified portion of the CG-Config field descriptions when the CG-Config message is modified as illustrated in the example of FIG. 9.

As illustrated in the example of FIG. 10, the requestedBC-MRDC field may be used to request configuring a band combination from the supprtedBandCombinationList in the UE-MRDC-Capability (in case of EN-DC or NE-DC) or the UE-NR-Capability (in case of NR-DC), and the requestedBC-MRDC field may be used for requesting the corresponding feature sets, which are forbidden to use by the master node (i.e., outside of the allowedBC-ListMRDC) to allow re-negotiation of the UE capability for SCG configuration. In NE-DC, when this field is included in the CG-Config message, the requestedBC-NEDC field need not be included.

Furthermore, as illustrated in the example of FIG. 10, the requestedBC-NE-DC field may be used to request configuring a band combination from the supported BandCombinationListNEDC-Only, and the requestedBC-NE-DC field may be used for requesting the corresponding feature sets, which are forbidden to use by the master node (i.e., outside of the allowedBC-ListNEDC) to allow re-negotiation of the UE capability for SCG configuration. If this field is included in the CG-Config message, the requestedBC-MRDC field need not be included. This field may be used only for NE-DC.

Furthermore, as illustrated in the example of FIG. 10, the selectedBandCombination field may indicate a band combination selected by the secondary node among one or more band combinations allowed by allowedBC-ListMRDC in EN-DC, NE-DC, and NR-DC. The secondary node may inform the master node with this field when the band combination and/or the feature set it selected for the SCG changes (i.e., even if the new selection concerns a band combination and/or feature set that is allowed by the allowedBC-ListMRDC). In NE-DC, when this field is included in the CFG-Config message, the selectedBandCombinationNEDC need not be included.

Furthermore, as illustrated in the example of FIG. 10, the selectedBandCombinationNEDC field may indicate the band combination selected by the secondary node among one or more band combinations allowed by allowedBC-ListNEDC, in NE-DC. The secondary node may inform the master node with this field when the band combination and/or feature set it selected for the SCG changes (i.e., even if the new selection concerns a band combination and/or feature set that is allowed by the allowedBC-ListNEDC). When this field is included in the CG-Config message, the selectedBandCombination need not be included. This field may be used only for NE-DC.

FIG. 11 and FIG. 12 are diagrams illustrating an example of a modification of a specification. FIG. 11 and FIG. 12 illustrate an example of changing the CG-ConfigInfo message. The CG-ConfigInfo message may be a message sent from the master node to the secondary node.

For example, as illustrated in the example of FIG. 11, a field for providing a notification related to NE-DC may be added to the CG-ConfigInfo message, which is allowedBC-ListNEDC.

FIG. 12 illustrates an example of a modified portion of the CG-ConfigInfo field descriptions when the CG-ConfigInfo message is modified as illustrated in the example of FIG. 11.

As illustrated in the example of FIG. 12, the allowedBC-ListNEDC field may indicate a list of indices referring to one or more band combinations in NE-DC capabilities from which the secondary node is allowed to select the SCG band combination. Each entry in the allowedBC-ListNEDC field may refer to one band combination among band combinations numbered according to supportedBandCombinationListNEDC-Only. All MR-DC band combinations indicated by this field may be a superset of the one or more MCG bands selected by the master node. When allowedBC-ListMRDC is included in the CG-ConfigInfo message, and this field is not included, the secondary node is not allowed to select an SCG band combination from supportedBandCombinationListNEDC-Only. When allowedBC-ListMRDC is not included in the CG-ConfigInfo message and this field is included, the secondary node is not allowed to select an SCG band combination from the supportedBandCombinationList. This field may only be used for NE-DC.

Operation Example

For example, suppose that the terminal 20 supports one or more band combinations that can be used only for NE-DC. The terminal 20 reports, to the master node, one or more band combinations that can be used only for NE-DC using the supportedBandCombinationListNEDC-Only indicating one or more band combinations that can be used only for NE-DC. The master node that receives, from the terminal 20, information indicating one or more band combinations that can be used only for NE-DC may include the information indicating one or more band combinations that can be used only for NE-DC, for example, in the allowedBC-ListNEDC included in the CG-ConfigInfo message, and the master node may transmit the CG-ConfigInfo message to the secondary node. The secondary node may select a band combination from the one or more band combinations that can be used only for NE-DC reported from the master node, the secondary node may include information indicating the selected band combination in the selectedBandCombinationNEDC, and the secondary node may send the CG-Config message including the selectedBandCombinationNEDC to the master node. According to this method, for executing NE-DC, the master node and the secondary node can configure a band combination that can be used only for NE-DC, which is indicated by supportedBandCombinationListNEDC-Only transmitted from the terminal 20.

(Proposal 2)

In the following, another example of a signaling is described, which is for configuring, when the terminal 20 supports a band combination that can be used only for NE-DC, an NE-DC band combination between base stations based on UE capability signaling from the terminal 20 indicating the band combination that can be used only for NE-DC. In the following example, existing signaling is applied to an NE-DC only band combination. Here, the existing signaling is made available for use in a case of NE-DC by adding an indicator to CG-ConfigInfo and CG-Config so that the indicator indicates whether CG-ConfigInfo or CG-Config is for NE-DC only.

When the terminal 20 supports a band combination that can be used only for NE-DC, for example, the terminal 20 reports the band combination to gNB that is a master node by dedicated capability signaling, which is supportedBandCombinationListNEDC-Only.

However, it is not assumed that the supportedBandCombinationListNEDC-only field is used as an MR-DC inter-node message. Namely, it is not assumed that the master node that receives the information indicating the band combination that can be used only for NE-DC from the terminal 20 through the supportedBandCombinationListNEDC-only field restricts band combinations for a secondary cell group (SCG) in accordance with one or more band combinations reported through the supprtedBandCombinationListNEDC-only field.

As a solution to the above-described problem, it can be considered, for example, by adding a new field to the CG-ConfigInfo IE, functions can be coordinated between MR-DC nodes based on one or more band combinations reported from the terminal 20 through the supportedBandCombinationListNEDC-only field. When an NE-DC band combination is configured between MR-DC nodes based on CG-Config, for example, it may be allowed to request, from the secondary node, a band combination other than one or more band combinations in the supportedBandCombinationListNEDC-Only that are allowed by the master node. Furthermore, it may be allowed for the secondary node to report, to the master node, a band combination selected from one or more band combinations in the supportedBandCombinationListNEDC-Only that are allowed by the master node.

FIG. 13 and FIG. 14 are diagrams illustrating an example of a modification of a specification. FIG. 13 and FIG. 14 illustrate an example of modifying a CG-Config message. The CG-Config message may be a message sent from the secondary node to the master node.

For example, as illustrated in the example of FIG. 13, a field may be added to the CG-Config message to provide a notification related to NE-DC, which is useBandConbinationListNEDC-Only.

FIG. 14 illustrates an example of a modified portion of the CG-Config field descriptions when the CG-Config message is modified as illustrated in the example of FIG. 13.

As illustrated in the example of FIG. 14, when a value of the useBandCombinationListNEDC-Only field is set to true, the requested BC-MRDC field may be used to request configuring a band combination from the supportedBandCombinationListNEDC-Only and corresponding feature sets, which are forbidden to use by the master node (i.e., outside of the allowedBC-ListMRDC) to allow re-negotiation of the UE capabilities for SCG configuration, and the selectedBandCombination field may indicate the band combination selected by the secondary node among one or more band combinations allowed by the allowedBC-ListMRDC. The secondary node may inform the master node with this field when the band combination and/or feature set it selected for the SCG changes (i.e., even if the new selection concerns a band combination and/or feature set that is allowed by the allowedBC-ListMRDC). This field may be used only for NE-DC.

Modified Example of FIG. 14

Note that band combinations for NE-DC are included, not only in the supportedBandCombinationListNEDC-only field, but also in the supportedBandCombinationList. Accordingly, in order to allow band combinations for NE-DC to be uniquely identified, it can be considered, for example, to arrange one or more band combinations included in the supportedBandCombinationList in ascending order of the original one or more indexes of the one or more band combinations in the supportedBandCombinationList, subsequently, to arrange one or more band combinations included in the supportedBandCombinationNEDC-Only in ascending order of the original one or more indexes of the one or more band combinations in the supportedBandCombinationListNEDC-Only, and, then, to newly assign indexes to the arranged plurality of band combinations in ascending order. In the embodiments, the band combinations are arranged in ascending order of the indexes. However, the arrangement of the band combinations is not limited to the ascending order. For example, the band combinations may be arranged in descending order of the indexes.

For example, suppose that indexes assigned to band combinations for NE-DC included in the supportedBandCombinationList are #1, #2, and #3, and the indexes assigned to band combinations included in the supprtedBandCombinationListNEDC-Only are #2, #3, and #4. In this case, the band combinations for NE-DC can be uniquely identified by arranging the band combinations #1, #2, and #3 included in the supportedBandCombinationList; subsequently, arranging the band combinations #2, #3, and #4 included in the supportedBandCombinationListNEDC-Only; assigning new indexes 1, 2, and 3 to the band combinations #1, #2, and #3 included in the supportedBandCombinationList, respectively; and assigning new indexes 4, 5, and 6 to the band combinations #2, #3, and #4 included in the supportedBandCombinationListNEDC-Only, respectively.

FIG. 20 is a diagram illustrating an example of a modification of a specification. FIG. 20 illustrates a modified portion of the BandCombinationInfoSN field. As illustrated in FIG. 20, the bandCombinationIndex field indicates a position of a band combination in the supportedBandCombinationList. For example, when the useBandCombinationListNEDC-Only is set to true, the bandCombinationIndex field may indicate an index of a plurality of indexes newly attached in ascending order to a plurality of band combinations, which are arranged by arranging one or more band combinations for NE-DC included in the supportedBandCombinationList in ascending order of the one or more original indexes of the one or more band combinations in the supportedBandCombinationList; and, subsequently, arranging one or more band combinations included in the supportedBandCombinationListNEDC-Only in ascending order of the one or more indexes of the one or more band combinations included in the supportedBandCombinationListNEDC-Only.

Note that embodiments are not limited to this example. For example, when the useBandCombinationListNEDC-Only is set to true, the bandCombinationIndex field may indicate an index of a plurality of indexes newly attached in ascending order to a plurality of band combinations, which are arranged by arranging one or more band combinations included in the supportedBandCombinationListNEDC-Only in ascending order of the one or more original indexes of the one or more band combinations in the supportedBandCombinationListNEDC-Only; and, subsequently, arranging one or more band combinations for NE-DC included in the supportedBandCombinationList in ascending order of the one or more indexes of the one or more band combinations included in the supportedBandCombinationList.

FIG. 15 and FIG. 16 are diagrams illustrating an example of a modification of a specification. FIG. 15 and FIG. 16 illustrate an example of modifying a CG-ConfigInfo message. The CG-ConfigInfo message may be a message sent from the master node to the secondary node.

For example, as illustrated in the example of FIG. 15, a field may be added to the CG-ConfigInfo message to provide a notification related to NE-DC, which is useBandConbinationListNEDC-Only.

FIG. 16 illustrates an example of a modified portion of the CG-ConfigInfo field descriptions when the CG-ConfigInfo message is modified as illustrated in the example of FIG. 15.

As illustrated in the example of FIG. 16, when a value of the useBandCombinationListNEDC-Only field is set to true, the allowedBC-ListMRDC field may indicate one or more band combinations in NE-DC capabilities from which the secondary node is allowed to select the SCG band combination. Each entry in the allowedBC-ListMRDC field may indicate one band combination of band combinations numbered according to the supportedBandCombinationListNEDC-Only. All MR-DC band combinations indicated by this field may be a superset of one or more MCG bands selected by the master node. When the allowedBC-ListMRDC is included in the CG-ConfigInfo message and this field is not included, the secondary node is not allowed to select an SCG band combination from the supportedBandCombinationListNEDC-Only. When the allowedBC-ListMRDC is not included in the CG-ConfigInfo message and this field is included, the secondary node is not allowed to select an SCG band combination from the supportedBandCombinationList. This field may be used only for NE-DC.

Operation Example

For example, suppose that the terminal 20 supports one or more band combinations that can be used only for NE-DC. The terminal 20 notifies the master node of one or more band combinations that can be used only for NE-DC using supportedBandCombinationListNEDC-Only indicating one or more band combinations that can be used only for NE-DC. The master node that receives, from the terminal 20, information from indicating the one or more band combinations that can be used only for NE-DC may, for example, set a value of the useBandCombinationListNEDC-Only field included in the CG-ConfigInfo message to true and send the CG-ConfigInfo message to the secondary node. The secondary node that receives the CG-ConfigInfo message transmitted from the master node detects that the value of the useBandCombinationListNEDC-Only field is set to true. The secondary node may select a band combination from the one or more band combinations that can be used only for NE-DC included in the allowedBC-ListMRDC, include information indicating the selected band combination in the selectedBandCombination, include the selectedBandCombination in the CG-Config message, set a value of the useBandCombinationListNEDC-Only field in the CG-Config message to true, and send the CG-Config message to the master node. According to this method, for executing NE-DC, the master node and the secondary node can configure a band combination that can be used only for NE-DC indicated by the supportedBandCombinationListNEDC-Only notified by the terminal 20.

Modified Example of FIG. 16

Note that band combinations for NE-DC are included, not only in the supportedBandCombinationListNEDC-only field, but also in the supportedBandCombinationList. Accordingly, the useBandCombinationListNEDC-Only field may be modified as illustrated in the example of FIG. 21. Namely, as illustrated in the example of FIG. 21, when a value of the useBandCombinationListNEDC-Only field is set to true, the allowedBC-ListMRDC field may indicate one or more band combinations in NE-DC capabilities from which the secondary node is allowed to select the SCG band combination. Each entry in the allowedBC-ListMRDC field may indicate one band combination of band combinations numbered according to the supportedBandCombinationList and supportedBandCombinationListNEDC-Only. All MR-DC band combinations indicated by this field may be a superset of the one or more MCG bands selected by the master node.

Note that band combinations for NE-DC are included, not only in the supportedBandCombinationListNEDC-only field, but also in the supportedBandCombinationList. Accordingly, in order to allow band combinations for NE-DC to be uniquely identified, it can be considered, for example, to arrange one or more band combinations included in the supportedBandCombinationList in ascending order of the original one or more indexes of the one or more band combinations in the supportedBandCombinationList, subsequently, to arrange one or more band combinations included in the supportedBandCombinationNEDC-Only in ascending order of the original one or more indexes of the one or more band combinations in the supportedBandCombinationListNEDC-Only, and, then, to newly assign indexes to the arranged plurality of band combinations in ascending order.

FIG. 22 is a diagram illustrating an example of a modification of a specification. FIG. 22 illustrates a modified portion of the BandCombinationInfo field. As illustrated in FIG. 22, the bandCombinationIndex field indicates a position of a band combination in the supportedBandCombinationList. For example, when the useBandCombinationListNEDC-Only is set to true, the bandCombinationIndex field may indicate an index of a plurality of indexes newly attached in ascending order to a plurality of band combinations, which are arranged by arranging one or more band combinations for NE-DC included in the supportedBandCombinationList in ascending order of the one or more original indexes of the one or more band combinations in the supportedBandCombinationList; and, subsequently, arranging one or more band combinations included in the supportedBandCombinationListNEDC-Only in ascending order of the one or more indexes of the one or more band combinations included in the supportedBandCombinationListNEDC-Only.

(Device Configuration)

Next, an example of a functional configuration of the base station 10 and the terminal 20 for performing the processes and operations described above is described. The base station 10 and terminal 20 include functions for implementing the embodiments described above. However, each of the base station 10 and the terminal 20 may include only a part of the functions in the embodiments.

<Base Station 10>

Figure 17:
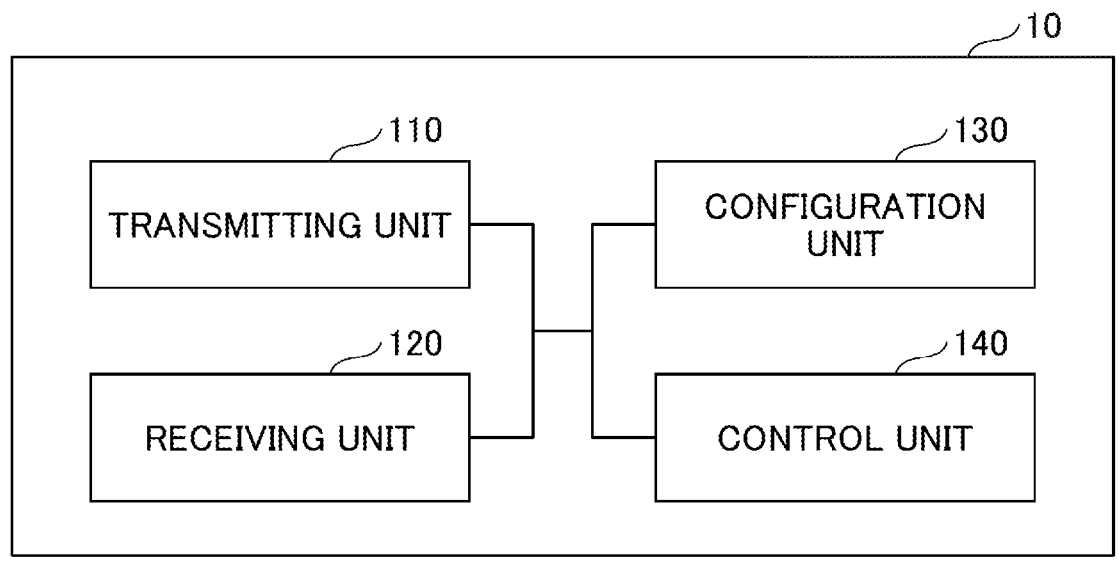
FIG. 17 is a diagram illustrating an example of a functional configuration of a base station according to an embodiment.

FIG. 17 is a diagram illustrating an example of a functional configuration of the base station 10 according to an embodiment of the present invention. As illustrated in FIG. 17, the base station 10 includes a transmitting unit 110; a receiving unit 120; a configuration unit 130; and a control unit 140. The functional configuration shown in FIG. 17 is only one example. If the operation according to the embodiments of the present invention can be executed, the functional division and the name of the functional units may be any division and names.

The transmitting unit 110 includes a function for generating a signal to be transmitted to the terminal 20 and transmitting the signal through radio. The transmitting unit 110 transmits a message between network nodes to the other network nodes. The receiving unit 120 includes a function for receiving various signals transmitted from the terminal 20 and retrieving, for example, information of a higher layer from the received signals. The transmitting unit 110 has a function to transmit NR-PSS, NR-SSS, NR-PBCH, DL/UL control signals, or the like to the terminal 20. The receiving unit 120 receives a message between network nodes from other network nodes.

The configuration unit 130 stores, in a storage device, preconfigured configuration information and various types of configuration information to be transmitted to the terminal 20 and reads out the information if necessary. The content of the configuration information is, for example, configuration information related to communication of the terminal 20, such as a configuration of a radio bearer or a configuration of a secondary cell.

As described in the embodiment, the control unit 140 creates information indicating a position of a lower end and a position of an upper end on a frequency axis of each component carrier of one or more component carriers configured in a single frequency band. The transmitting unit 110 transmits, to another network node, the information indicating the position of the lower end and the position of the upper end on the frequency axis of each component carrier generated by the control unit 140. The receiving unit 120 may receive, from another network node, a signal for requesting reconfiguration of a frequency band of a component carrier among the configured component carriers.

The control unit 140 also determines, in a single frequency band, one or more frequency bands in which one or more LTE component carriers are configured. The control unit 140 identifies an index indicating an E-UTRA-NR configuration/Bandwidth combination set corresponding to one or more frequency bands of the one or more configured LTE component carriers by referring to a table indicating an index of Downlink EN-DC configuration and an Uplink EN-DC configuration stored in the configuration unit 130. The transmitting unit 110 transmits the index identified by the control unit 140 to another network node. The receiving unit 120 may also receive signals from another network node requesting reconfiguration of a frequency band of a component carrier among the configured component carriers. The receiving unit 120 receives, from the terminal 20, supportedBandCombinationListNEDC-Only indicating one or more band combinations that can be used only for NE-DC and detects information indicating one or more band combinations that can be used only for NE-DC. For example, the control unit 140 may include information indicating one or more band combinations that can be used only for NE-DC in the allowedBC-ListNEDC included in the CG-ConfigInfo message, and the transmitting unit 110 may transmit the CG-ConfigInfo message to a secondary node.

<Terminal 20>

Figure 18:
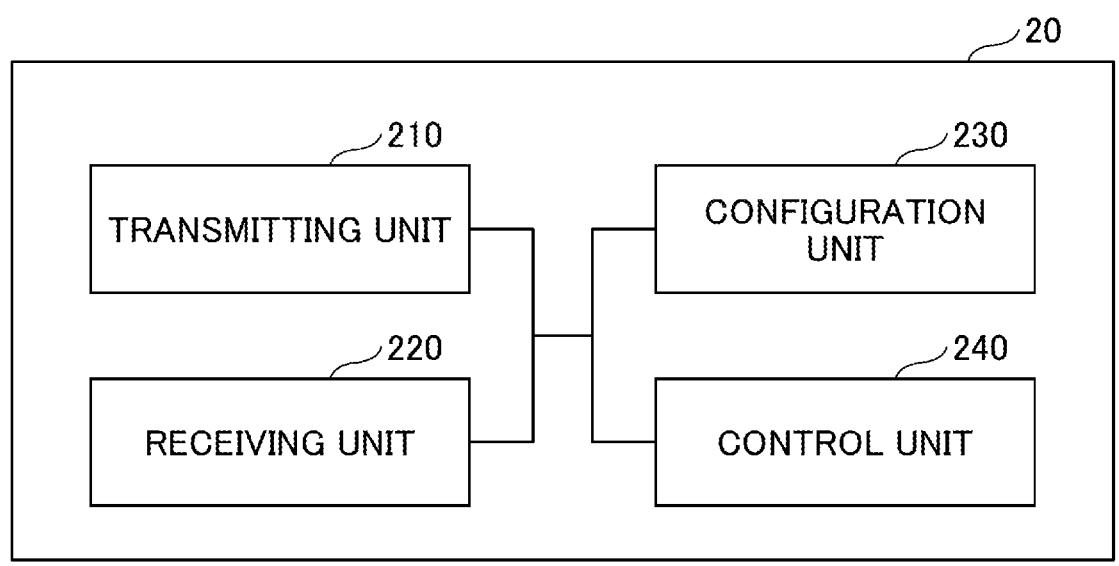
FIG. 18 is a diagram illustrating an example of a functional configuration of a terminal according to an embodiment.

FIG. 18 is a diagram illustrating an example of a functional configuration of a terminal 20 according to an embodiment of the present invention. As illustrated in FIG. 18, the terminal 20 includes a transmitting unit 210; a receiving unit 220; a configuration unit 230; and a control unit 240. The functional configuration shown in FIG. 18 is only one example. If the operation according to the embodiments of the present invention can be performed, the functional division and the name of the functional units may be any division and names.

The transmitting unit 210 creates a transmission signal from transmission data and transmits the transmission signal through radio. The receiving unit 220 receives various signals through radio and retrieves higher layer signals from the received physical layer signals. The receiving unit 220 has a function to receive NR-PSS, NR-SSS, NR-PBCH, DL/UL/SL control signals, or the like transmitted from the base station 10. For example, the transmitting unit 210 transmits PSCCH (Physical Sidelink Control Channel), PSSCH (Physical Sidelink Shared Channel), PSDCH (Physical Sidelink Discovery Channel), PSBCH (Physical Sidelink Broadcast Channel), or the like to the other terminal 20 as D2D communication, and the receiving unit 120 receives PSCCH, PSSCCH, PSDCH, PSDCH, or the like from the other terminal 20.

The configuration unit 230 stores various types of configuration information received from the base station 10 or the terminal 20 by the receiving unit 220 and reads out the information, if necessary. The configuration unit 230 also stores preconfigured configuration information. The content of the configuration information is, for example, configuration information related to communication by the terminal 20, such as a radio bearer or a configuration of a secondary cell.

The control unit 240 performs radio communication to which EN-DC (which may be NR-DC or NE-DC) is applied, as described in the embodiments. The control unit 240 receives information related to radio communication from the base station 10, controls the radio communication of the terminal 20 based on the information, and reports necessary information to the base station 10. A functional unit related to signal transmission in the control unit 240 may be included in the transmitting unit 210, and a functional unit related to signal reception in the control unit 240 may be included in the receiving unit 220. The control unit 240 configures the information indicating one or more band combinations that can be used only for NE-DC in the supportBandCombinationListNEDC-Only, and the transmitting unit 210 notifies the base station 10 of one or more band combinations that can be used only for NE-DC by transmitting a signal including the supportedBandCombinationListNEDC-Only to the base station 10.

(Hardware Configuration)

Block diagrams (FIGS. 17 and 18) used in the description of the above embodiments illustrate blocks of functional units. These functional blocks (components) are implemented by any combination of at least one of hardware and software. In addition, an implementation method of each function block is not particularly limited. That is, each functional block may be implemented using a single device that is physically or logically combined, or may be implemented by directly or indirectly connecting two or more devices that are physically or logically separated (e.g., using wire or radio) and using these multiple devices. The functional block may be implemented by combining software with the above-described one device or the above-described plurality of devices Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, or the like. For example, a functional block (component) that functions to transmit is called a transmitting unit or a transmitter. In either case, as described above, the implementation method is not particularly limited.

Figure 19:
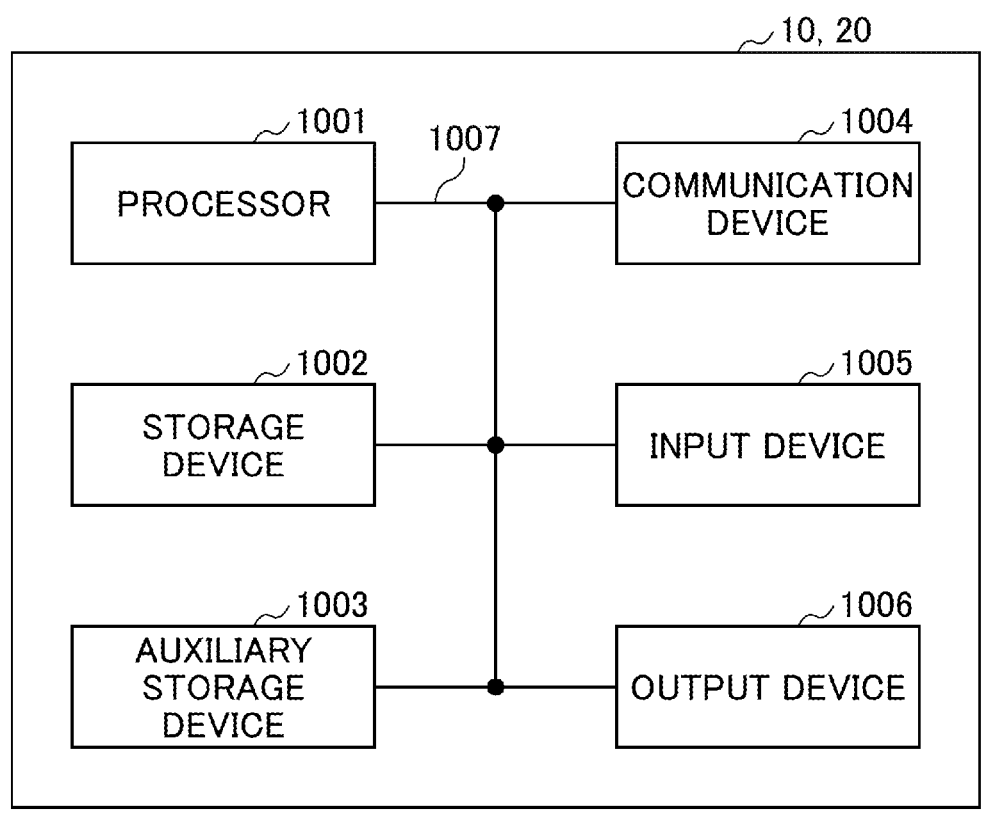
FIG. 19 is a diagram illustrating an example of a hardware configuration of a base station or a terminal according to an embodiment.

For example, the base station 10, the terminal 20 according to the embodiments of the present invention may function as a computer that performs processing of the radio communication method according to the present disclosure. FIG. 19 is a diagram illustrating an example of a hardware configuration of the base station 10 and the terminal 20 according to an embodiment of the present disclosure. The base station 10 and the terminal 20 may each be configured as a computer device including, physically, a processor 1001, a storage device 1002, an auxiliary storage device 1003, a communication device 1004, an input device 1005, an output device 1006, a bus 1007, or the like.

In the following description, the term "device" can be replaced with a circuit, a device, a unit, or the like. The hardware configuration of the base station 10 and terminal 20 may be configured to include one or more of the devices depicted in the figure, or may be configured without some devices.

Each function of the base station 10 and the terminal 20 is implemented by loading predetermined software (program) on hardware, such as the processor 1001 and the storage device 1002, so that the processor 1001 performs computation and controls communication by the communication device 1004, and at least one of reading and writing of data in the storage device 1002 and the auxiliary storage device 1003.

The processor 1001, for example, operates an operating system to control the entire computer. The processor 1001 may be configured with a central processing unit (CPU: Central Processing Unit) including an interface with a peripheral device, a control device, a processing device, a register, or the like. For example, the above-described control unit 140, control unit 240, or the like may be implemented by the processor 1001.

Additionally, the processor 1001 reads a program (program code), a software module, data, or the like from at least one of the auxiliary storage device 1003 and the communication device 1004 to the storage device 1002, and executes various processes according to these. As the program, a program is used which causes a computer to execute at least a part of the operations described in the above-described embodiments. For example, the control unit 140 of the base station 10 illustrated in FIG. 17 may be implemented by a control program that is stored in the storage device 1002 and that is operated by the processor 1001. Furthermore, for example, the control unit 240 of the terminal 20 illustrated in FIG. 18 may be implemented by a control program that is stored in the storage device 1002 and that is operated by the processor 1001. While the various processes described above are described as being executed in one processor 1001, they may be executed simultaneously or sequentially by two or more processors 1001. The processor 1001 may be implemented by one or more chips. The program may be transmitted from a network via a telecommunications line.

The storage device 1002 is a computer readable storage medium, and, for example, the storage device 1002 may be formed of at least one of a Read Only Memory (ROM), an Erasable Programmable ROM (EPROM), an Electrically Erasable Programmable ROM (EEPROM), a Random Access Memory (RAM), or the like. The storage device 1002 may be referred to as a register, a cache, a main memory (main storage device), or the like. The storage device 1002 may store a program (program code), a software module, or the like which can be executed for implementing the communication method according to one embodiment of the present disclosure.

The auxiliary storage device 1003 is a computer readable storage medium and may be formed of, for example, at least one of an optical disk, such as a Compact Disc ROM (CD-ROM), a hard disk drive, a flexible disk, an optical magnetic disk (e.g., a compact disk, a digital versatile disk, a Blu-ray (registered trademark) disk, a smart card, a flash memory (e.g., a card, a stick, a key drive), a floppy (registered trademark) disk, a magnetic strip, or the like. The above-described storage medium may be, for example, a database including at least one of the storage device 1002 and the auxiliary storage device 1003, a server, or any other suitable medium.

The communication device 1004 is hardware (transmitting and receiving device) for performing communication between computers through at least one of a wired network and a wireless network, and is also referred to, for example, as a network device, a network controller, a network card, a communication module, or the like. The communication device 1004 may be configured to include, for example, a high frequency switch, a duplexer, a filter, or a frequency synthesizer to implement at least one of frequency division duplex (FDD: Frequency Division Duplex) and time division duplex (TDD: Time Division Duplex). For example, a transmitting/receiving antenna, an amplifier unit, a transceiver unit, or a transmission line interface may be implemented by the communication device 1004. The transceiver unit may be implemented so that the transmitting unit and the receiving unit are physically or logically separated.

The input device 1005 is an input device (e.g., a keyboard, a mouse, a microphone, a switch, a button, or a sensor) that receives an external input. The output device 1006 is an output device (e.g., a display, speaker, or LED lamp) that performs output toward outside. The input device 1005 and the output device 1006 may be configured to be integrated (e.g., a touch panel).

Each device, such as the processor 1001 and the storage device 1002, is also connected by the bus 1007 for communicating information. The bus 1007 may be formed of a single bus or may be formed of different buses between devices.

The base station 10 and the terminal 20 may each include hardware, such as a microprocessor, a digital signal processor (DSP), an Application Specific Integrated Circuit (ASIC), a Programmable Logic Device (PLD), and a Field Programmable Gate Array (FPGA), which may implement some or all of each functional block. For example, processor 1001 may be implemented using at least one of these hardware components.

Conclusion of Embodiments

This specification discloses at least the base station, the network node and the communication method described below.

A network node including a receiving unit that receives a signal including information indicating a first group consisting of one or more band combinations that can be used only for a specific dual connectivity and information indicating a second group consisting of one or more band combinations that can be used for the specific dual connectivity in a terminal; a control unit that assigs a plurality of indexes to a corresponding plurality of band combinations of a third group, the third group consisting of the plurality of band combinations consisting of the one or more band combinations of the first group and the one or more band combinations of the second group, so that each band combination of the plurality of band combinations of the third group can be uniquely identified; and a transmitting unit that transmits, to another network node, a signal that can be used for communication between the network nodes, the signal including information indicating the plurality of band combinations of the third group. A base station including a receiving unit that receives a signal including information indicating a first group consisting of one or more band combinations that can be used only for a specific dual connectivity and information indicating a second group consisting of one or more band combinations that can be used for the specific dual connectivity in a terminal; a control unit that assigs a plurality of indexes to a corresponding plurality of band combinations of a third group, the third group consisting of the plurality of band combinations consisting of the one or more band combinations of the first group and the one or more band combinations of the second group, so that each band combination of the plurality of band combinations of the third group can be identified; and a transmitting unit that transmits, to another base station, a signal that can be used for communication between the base station, the signal including the indexes.

According to the above-described configuration, upon receiving band combinations that can be used for NE-DC from a terminal through supportedBandCombinationList and supportedBandCombinationListNEDC-only fields, the master node can indicate a band combination for a secondary cell group (SCG) in accordance with the band combinations received through the supportedBandCombinationList and supportedBandCombinationListNEDC-only fields.

The network node and/or the base station may be a master node and support a New Radio (NR) communication scheme, and the other network node may be a secondary node and support an LTE (Long Term Evolution) communication scheme.

According to the above-described configuration, for NE-DC, a band combination can be configured by coordinating between the base stations.

The network node and/or the base station may be connected to a 5G-Core Network (5GC).

According to the above-described configuration, for NE-DC, a band combination can be configured by coordinating between the base stations.

A response signal received from the other network node and/or the other base station may include a band combination selected by the other network node from among the plurality of band combinations of the third group.

According to the above-described configuration, for NE-DC, the master node can configure a band combination that is selected by the secondary node.

A communication method by a network node, the method including receiving a signal including information indicating a first group consisting of one or more band combinations that can be used only for a specific dual connectivity and information indicating a second group consisting of one or more band combinations that can be used for the specific dual connectivity in a terminal; assigning a plurality of indexes to a corresponding plurality of band combinations of a third group, the third group consisting of the plurality of band combinations consisting of the one or more band combinations of the first group and the one or more band combinations of the second group, so that each band combination of the plurality of band combinations of the third group can be uniquely identified; and transmitting, to another network node, a signal that can be used for communication between the network nodes, the signal including information indicating the plurality of band combinations of the third group. A communication method by a base station, the method including receiving capability information including information indicating a first group consisting of one or more band combinations that can be used only for a specific dual connectivity and information indicating a second group consisting of one or more band combinations that can be used for the specific dual connectivity in a terminal; assigning a plurality of indexes to a corresponding plurality of band combinations of a third group, the third group consisting of the plurality of band combinations consisting of the one or more band combinations of the first group and the one or more band combinations of the second group, so that each band combination of the plurality of band combinations of the third group can be identified; and transmitting, to another base station, a signal that can be used for communication between the base stations, the signal including the indexes.

According to the above-described configuration, upon receiving a band combination that can be used for NE-DC from a terminal through the supportedBandCombinationListNEDC-only field, the master node can indicate a band combination for a secondary cell group (SCG) in accordance with the one or more band combinations received through the supportedBandCombinationListNEDC-only field.

Supplemental Embodiments

While the embodiments of the present invention are described above, the disclosed invention is not limited to the embodiments, and those skilled in the art will appreciate various alterations, modifications, alternatives, substitutions, or the like. Descriptions are provided using specific numerical examples to facilitate understanding of the invention, but, unless as otherwise specified, these values are merely examples and any suitable value may be used. Classification of the items in the above descriptions is not essential to the present invention, and the items described in two or more items may be used in combination as needed, or the items described in one item may be applied (unless inconsistent) to the items described in another item. The boundaries of functional units or processing units in the functional block diagram do not necessarily correspond to the boundaries of physical components. An operation by a plurality of functional units may be physically performed by one component or an operation by one functional unit may be physically executed by a plurality of components. For the processing procedures described in the embodiment, the order of processing may be changed as long as there is no inconsistency. For the convenience of the description of the process, the base station 10 and the terminal 20 are described using functional block diagrams, but such devices may be implemented in hardware, software, or a combination thereof. Software operated by a processor included in the base station 10 in accordance with embodiments of the present invention and software operated by a processor included in the terminal 20 in accordance with embodiments of the present invention may be stored in a random access memory (RAM), a flash memory (RAM), a read-only memory (ROM), an EPROM, an EEPROM, a register, a hard disk (HDD), a removable disk, a CD-ROM, a database, a server, or any other suitable storage medium, respectively.

Notification of information is not limited to the aspects/embodiments described in the disclosure, and notification of information may be made by another method. For example, notification of information may be implemented by physical layer signaling (e.g., DCI (Downlink Control Information), UCI (Uplink Control Information), higher layer signaling (e.g., RRC (Radio Resource Control) signaling, MAC (Medium Access Control) signaling, broadcast information (MIB (Master Information Block), SIB (System Information Block))), or other signals or combinations thereof. RRC signaling may be referred to as an RRC message, for example, which may be an RRC connection setup message, an RRC connection reconfiguration message, or the like.

The aspects/embodiments described in this disclosure may be applied to a system using at least one of LTE (Long Term Evolution), LTE-A (LTE-Advanced), SUPER 3G, IMT-Advanced, 4G (4th generation mobile communication system), 5G (5th generation mobile communication system), FRA (Future Radio Access), W-CDMA (Registered Trademark), GSM (Registered Trademark), CDMA2000, UMB (Ultra Mobile Broadband), IEEE 802.11 (Wi-Fi (Registered Trademark)), IEEE 802.16 (WiMAX (Registered Trademark)), IEEE 802.20, UWB (Ultra-WideBand), Bluetooth (Registered Trademark), any other appropriate system, and a next generation system extended based on theses. Additionally, a plurality of systems may be combined (e.g., a combination of at least one of LTE and LTE-A and 5G) to be applied.

The processing procedures, sequences, flow charts, or the like of each aspect/embodiment described in this disclosure may be reordered, provided that there is no contradiction. For example, the methods described in this disclosure present elements of various steps in an exemplary order and are not limited to the particular order presented.

The particular operation described in this specification to be performed by base station 10 may be performed by an upper node in some cases. It is apparent that in a network consisting of one or more network nodes having base station 10, various operations performed for communicating with terminal may be performed by at least one of the base station 10 and network nodes other than the base station 10 (e.g., MME or S-GW can be considered, however, the network node is not limited to these). The case is exemplified above in which there is one network node other than the base station 10. However, the network node other than the base station 10 may be a combination of multiple other network nodes (e.g., MME and S-GW).

The information or signals described in this disclosure can be output from a higher layer (or lower layer) to a lower layer (or higher layer). It may be input and output through multiple network nodes.

Input and output information may be stored in a specific location (e.g., memory) or managed using management tables. Input and output information may be overwritten, updated, or added. Output information may be deleted. The input information may be transmitted to another device.

The determination in the disclosure may be made by a value (0 or 1) represented by 1 bit, by a true or false value (Boolean: true or false), or by comparison of numerical values (e.g., a comparison with a predefined value).

Software should be broadly interpreted to mean, regardless of whether referred to as software, firmware, middleware, microcode, hardware description language, or any other name, instructions, sets of instructions, code, code segments, program code, programs, subprograms, software modules, applications, software applications, software packages, routines, subroutines, objects, executable files, executable threads, procedures, functions, or the like.

Software, instructions, information, or the like may also be transmitted and received via a transmission medium. For example, when software is transmitted from a website, server, or other remote source using at least one of wireline technology (such as coaxial cable, fiber optic cable, twisted pair, digital subscriber line) and wireless technology (infrared or microwave), at least one of these wireline technology and wireless technology is included within the definition of a transmission medium.

The information, signals, or the like described in this disclosure may be represented using any of a variety of different techniques. For example, data, instructions, commands, information, signals, bits, symbols, or chips which may be referred to throughout the above description may be represented by voltages, currents, electromagnetic waves, magnetic fields or magnetic particles, optical fields or photons, or any combination thereof.

The terms described in this disclosure and those necessary for understanding this disclosure may be replaced by terms having the same or similar meanings. For example, at least one of the channels and the symbols may be a signal (signaling). The signal may also be a message. The component carrier may also be referred to as a carrier frequency, cell, frequency carrier, or the like.

As used in this disclosure, the terms "system" and "network" are used interchangeably.

The information, parameters, or the like described in the present disclosure may also be expressed using absolute values, relative values from predetermined values, or they may be expressed using corresponding separate information. For example, radio resources may be those indicated by an index.

The name used for the parameters described above are not restrictive in any respect. In addition, the mathematical equations using these parameters may differ from those explicitly disclosed in this disclosure. Since the various channels (e.g., PUCCH or PDCCH) and information elements can be identified by any suitable name, the various names assigned to these various channels and information elements are not in any way limiting.

In this disclosure, the terms "Base Station," "Radio Base Station," "Fixed Station," "NodeB," "eNodeB(eNB)," "gNodeB (gNB)," "Access Point," "Transmission Point," "Reception Point," "Transmission/Reception Point," "Cell," "Sector," "Cell Group," "Carrier," "Component Carrier," or the like may be used interchangeably. The base stations may be referred to in terms such as macro-cell, small-cell, femto-cell, pico-cell, or the like.

The base station can accommodate one or more (e.g., three) cells. Where the base station accommodates a plurality of cells, the entire coverage area of the base station can be divided into a plurality of smaller areas, each smaller area can also provide communication services by means of a base station subsystem (e.g., an indoor small base station (RRH) or a remote Radio Head). The term "cell" or "sector" refers to a portion or all of the coverage area of at least one of the base station and base station subsystem that provides communication services at the coverage.

In this disclosure, terms such as "mobile station (MS: Mobile Station)", "user terminal", "user equipment (UE: User Equipment)", "terminal", or the like may be used interchangeably.

The mobile station may be referred to by one of ordinary skill in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable term.

At least one of a base station and a mobile station may be referred to as a transmitter, receiver, communication device, or the like. At least one of a base station and a mobile station may be a device installed in a mobile body, a mobile body itself, or the like. The mobile body may be a vehicle (e.g., a car or an airplane), an unmanned mobile (e.g., a drone or an automated vehicle), or a robot (manned or unmanned). At least one of a base station and a mobile station includes a device that does not necessarily move during communication operations. For example, at least one of a base station and a mobile station may be an IoT (Internet of Things) device such as a sensor.

In addition, the base station in the present disclosure may be read by the user terminal. For example, various aspects/embodiments of the present disclosure may be applied to a configuration in which communication between the base stations and the user terminal is replaced with communication between multiple user terminals 20 (e.g., may be referred to as D2D (Device-to-Device) or V2X (Vehicle-to-Everything)). In this case, a configuration may be such that the above-described function of the base station 10 is included in the user terminal 20. The terms "up" and "down" may also be replaced with the terms corresponding to terminal-to-terminal communication (e.g., "side"). For example, an uplink channel, a downlink channel, or the like may be replaced with a sidelink channel.

Similarly, the user terminal in the present disclosure may be replaced with the base station. In this case, a configuration may be such that the above-described function of the user terminal may be included in the base station.

The terms "determine (determining)" and "decide (determining)" used in this disclosure may include various types of operations. For example, "determining" and "deciding" may include deeming that a result of judging, calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided. "Determine (decision)" may be replaced with "assuming," "expected," "considering," or the like.

The term "connected" or "coupled" or any variation thereof means any direct or indirect connection or connection between two or more elements and may include the presence of one or more intermediate elements between two elements "connected" or "coupled" with each other. The coupling or connection between the elements may be physical, logical, or a combination of these. For example, "connection" may be replaced with "access". As used in the present disclosure, the two elements may be considered as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS (Reference Signal) or may be referred to as a pilot, depending on the standards applied.

As used in this disclosure, the expression "based on" does not mean "based on only" unless otherwise specified. In other words, the expression "based on" means both "based on only" and "at least based on."

Any reference to elements using names, such as "first" and "second," as used in this disclosure does not generally limit the amount or order of those elements. These names can be used in this specification as a convenient way to distinguish between two or more elements. Accordingly, the reference to the first and second elements does not imply that only two elements can be adopted, or that the first element must precede the second element in some way.

The "means" in the configuration of each of the above-described devices may be replaced with "part," "circuit," "device," or the like.

As long as "include," "including," and variations thereof are used in this disclosure, the terms are intended to be inclusive in a manner similar to the term "comprising." Furthermore, the term "or" used in the disclosure is intended not to be an exclusive OR.

In the present disclosure, for example, if an article is added by translation, such as a, an, and the in English, the present disclosure may include that the noun following the article is plural.

In the present disclosure, the term "A and B are different" may imply that "A and B are different from each other." Note that the term may also imply "each of A and B is different from C." The terms, such as "separated" or "coupled" may also be interpreted similarly.

The aspects/embodiments described in this disclosure may be used alone, in combination, or switched with implementation. Notification of predetermined information (e.g. "X" notice) is not limited to a method that is explicitly performed, and may also be made implicitly (e.g. "no notice of the predetermined information").

While the present disclosure is described in detail above, those skilled in the art will appreciate that the present disclosure is not limited to the embodiments described in the present disclosure. The disclosure may be implemented as modifications and variations without departing from the gist and scope of the disclosure as defined by the claims. Accordingly, the description of the present disclosure is for illustrative purposes only and is not intended to have any restrictive meaning with respect to the present disclosure.

This international patent application is based on and claims priority to Japanese Patent Application No. 2020-033804 filed on Feb. 28, 2020, and the entire content of Japanese Patent Application No. 2020-033804 is incorporated herein by reference.

LIST OF REFERENCE SYMBOLS 10 base station
110 transmitting unit
120 receiving unit
130 configuration unit
140 control unit
20 user equipment
210 transmitting unit
220 receiving unit
230 configuration unit
240 control unit
1001 processor
1002 storage device
1003 auxiliary storage device
1004 communication device
1005 input device
1006 output device

The invention claimed is:

1. A base station comprising:
    a receiver that receives capability information including information indicating a first group consisting of one or more band combinations that can be used only for a specific dual connectivity, and information indicating a second group consisting of one or more band combinations that can be used for the specific dual connectivity in a terminal;
    a processor that assigns a plurality of indexes to a corresponding plurality of band combinations of a third group, the third group consisting of the plurality of band combinations consisting of the one or more band combinations of the first group and the one or more band combinations of the second group, so that each band combination of the plurality of band combinations of the third group can be identified; and
    a transmitter that transmits, to another base station, a signal that can be used for communication between the base stations, the signal including the indexes,
    wherein the plurality of indexes indicate positions of the plurality of band combinations of the third group in a list;
    wherein the base station is a master node and supports a New Radio (NR) communication scheme, and
    wherein the other base station is a secondary node and supports a Long Term Evolution (LTE) communication scheme;
    wherein the base station is connected to a 5G-Core Network (SGC).

2. The base station according to claim 1, wherein a response signal received from the other base station includes a band combination selected by the other base station from among the plurality of band combinations of the third group.

3. A communication method by a base station, the method comprising:
    receiving capability information including information indicating a first group consisting of one or a more band combinations that can be used only for a specific dual connectivity and information indicating a second group consisting of one or more band combinations that can be used for the specific dual connectivity in a terminal;
    assigning a plurality of indexes to a corresponding plurality of band combinations of a third group, the third group consisting of the plurality of band combinations consisting of the one or more band combinations of the first group and the one or more band combinations of the second group, so that each band combination of the plurality of band combinations of the third group can be identified; and
    transmitting, to another base station, a signal that can be used for communication between the base stations, the signal including the indexes,
    wherein the plurality of indexes indicate positions of the plurality of band combinations of the third group in a list;
    wherein the base station is a master node and supports a New Radio (NR) communication scheme, and
    wherein the other base station is a secondary node and supports a Long Term Evolution (LTE) communication scheme;
    wherein the base station is connected to a 5G-Core Network (SGC).

* * * * *